US007452392B2

(12) United States Patent
Nick et al.

(10) Patent No.: US 7,452,392 B2
(45) Date of Patent: Nov. 18, 2008

(54) PROCESS FOR PYROLYTIC HEAT RECOVERY ENHANCED WITH GASIFICATION OF ORGANIC MATERIAL

(76) Inventors: Peter A. Nick, 6362 Glenknoll Dr., Yorba Linda, CA (US) 92886; Hugh Hunnicutt, 2955 Panta Del Este, Hacienda Heights, CA (US) 91745; Robert Roy Peters, 442 Canyon Country Rd., Brea, CA (US) 92821; Eric A. Anderson, 1563 N. Pepper Dr., Pasadena, CA (US) 91104; Geoffrey E. Dolbear, 23050 Aspen Knoll Dr., Diamond Bar, CA (US) 91765

( * ) Notice: Subject to any disclaimer, the term of this patent is extended or adjusted under 35 U.S.C. 154(b) by 309 days.

(21) Appl. No.: 10/997,334

(22) Filed: Nov. 23, 2004

(65) Prior Publication Data

US 2006/0112639 A1 Jun. 1, 2006

Related U.S. Application Data

(60) Provisional application No. 60/592,329, filed on Jul. 28, 2004, provisional application No. 60/525,790, filed on Nov. 29, 2003.

(51) Int. Cl.
*C01J 3/16* (2006.01)
(52) U.S. Cl. .............................. 48/198.1; 48/61; 48/76; 48/202; 48/75; 48/63; 48/214 R; 48/215; 422/240; 422/241; 422/232; 422/234
(58) Field of Classification Search ........................ None
See application file for complete search history.

(56) References Cited

U.S. PATENT DOCUMENTS

| 4,052,173 | A | * | 10/1977 | Schulz | 48/202 |
| 4,156,394 | A | * | 5/1979 | Mallek et al. | 110/346 |
| 4,592,762 | A | * | 6/1986 | Babu et al. | 48/197 R |
| 4,732,091 | A | * | 3/1988 | Gould | 110/229 |
| 4,823,711 | A | * | 4/1989 | Kroneberger et al. | 110/236 |
| 5,034,021 | A | * | 7/1991 | Richardson | 48/77 |
| 6,024,032 | A | * | 2/2000 | Sharpe | 110/342 |
| 6,048,374 | A | * | 4/2000 | Green | 48/209 |
| 2002/0095866 | A1 | * | 7/2002 | Hassett | 48/199 FM |
| 2004/0182294 | A1 | * | 9/2004 | Hahn et al. | 110/347 |

* cited by examiner

*Primary Examiner*—Alexa D. Neckel
*Assistant Examiner*—Kaity V. Handal

(57) ABSTRACT

This invention is a reactor and a process for the conversion of organic waste material such as municipal trash, sewage, post-consumer refuse, and biomass to commercially salable materials.

The invention produces the following:
1. Maximum energy conversion from the organic material
2. High volume consumption of the organic feed material
3. Less pollution of gaseous products than prior art systems
4. Solid residuals for disposal are minimal and non-hazardous.

The conversion is accomplished by combining anaerobic gasification and pyrolysis of the feed organic material and making it into synthetic gas. The synthetic gas is a mixture of hydrocarbons ($C_xH_y$), hydrogen, and carbon monoxide with small amounts of carbon dioxide and nitrogen. An essential feature of the invention is a hot driver gas, devoid of free oxygen and rich in water, which supplies the entire thermal and chemical energy needed for the reactions. This hot driver gas is produced by complete sub-stoichiometric combustion of the fuel ($C_xH_y$) before it enters the reactor.

19 Claims, 5 Drawing Sheets

PROCESS FOR PYROLYTIC HEAT RECOVERY ENHANCED WITH GASIFICATION OF ORGANIC MATERIAL

REFERENCE TO RELATED APPLICATIONS

This application is a continuation-in-part of U.S. provisional patent applications Ser. No. 60/525,790, filed Nov. 29, 2003 and 60/592,329, filed Jul. 28, 2004, both of which are incorporated herein by reference.

BACKGROUND OF THE INVENTION

1. Field of the Invention

The present invention describes a method of Pyrolytic Heat Recovery Enhanced with Gasification (PHREG) for a wide variety of heterogeneous organic materials. The invention proper is limited to the design and operation of reactor and driver gas generation facilities, but an entire process built around the reactor is described in some detail to provide context and clarity of concept.

The process of this invention converts heterogeneous organic materials such as municipal refuse, coal, biomass, agricultural wastes, hazardous wastes, petroleum coke and oil shale, individually or as mixtures, into valuable high energy content gas. This gas can is suitable for making hydrogen, synthetic hydrocarbons, and other industrial chemical products, or for burning to recover fuel values. The process achieves a significant reduction in volume (approximately 20 fold) and weight (approximately 10 fold) of residual solid material. It combines high temperature pyrolysis of a heterogeneous solid organic feed materials and anaerobic gasification of the resulting pyrolyticly generated char material.

2. Description of Related Art

Mankind generates immense amounts of wastes as a result of daily living. Many of these wastes result directly from individual behavior, but many others result from agricultural and industrial activities that provide various goods that we buy and use. Many of these wastes are collected and treated or disposed of by municipal waste utilities; examples are sewage treatment and garbage pickup. Some of this waste is converted to useful products (e.g., aluminum cans and newsprint), but most eventually ends up buried in the ground in landfills. In the past, and in many places even today, the volumes buried in landfills are relatively small compared to the available space for them; but every US community with more than about a million citizens faces an uncertain future as the available landfill space is beginning to be exhausted. Some cities are shipping wastes great distances for disposal, and resistance to receiving these wastes is growing. In an extreme example, during the 1990s a barge load of wastes from New York City traveled from port to port for months looking for a suitable disposal site, eventually returning to New York.

Efforts in the past to recycle the energy values while reducing the volume of these wastes have been relatively unsuccessful. A survey of available technical literature and issued patents on processes for the pyrolytic (thermal) decomposition of organic matter in such wastes shows a large amount of information stems from projects funded by the United States Department of Energy. Such projects range in scope from outright incineration (probably 85-90% of the work) of municipal waste, coal, and biomass to true pyrolytic processes where no oxygen is brought into contact with the wastes during treatment. Most of this work was conceived and funded for study in the late 1970s and early 1980s in the aftermath of the Arab and Iranian oil crises (1).

Many of the resulting processes which began with efforts to use other organic material, mostly coal, though several projects using biomass and municipal solid waste have also been funded and even commercialized to some extent. Several of these plants have been started and successfully run for several years. Some of them are still operating, especially in areas of the world where indigenous oil and gas are rare but coal is plentiful.

Water gas production from the reaction of steam with coal or coke was the principal means of providing municipal heating and lighting gas for the first thirty years of this century. South Africa is an example, where the SASOL coal gasification complex has successfully supplied gasoline, chemicals and synthetic natural gas to that nation for over 40 years. Germany supplied much of its war needs in the 1940's from coal pyrolysis and gasification. (4) Dakota Gasification Co. operates large 300 MW high sulfur lignite to Synthetic Natural Gas (SNG) plant in Beulah, N. Dak. Texaco has demonstrated a gasification technology for nearly 30 years based on partial oxidation as well as steam-gas reforming. Most of these facilities take the produced "syngas" and convert it to various types of fuels and/or chemicals. This type of technology, using mostly natural gas for simplicity, is the primary way that hydrogen is made for thousands of refineries and fertilizer plants in the world today.

Most of the currently existing facilities and project proposals for reducing the volumes of various solid wastes center on technologies that can be best described as incineration. In processes based on these technologies, the wastes are combusted in the presence of excess air or oxygen, with some amount of heat recovered from the resulting flue gases. While the apparent simplicity of incineration technologies has much to recommend them, there is an important added complexity of trace noxious and hazardous compounds in the product gases. Such gases include oxides of sulfur (SOx) from the burning of sulfur-containing compounds in the feed. They also include nitrogen oxides (NOx) from the reaction of oxygen with nitrogen in the air during combustion. Other problem emissions include carcinogenic dioxins, which form during combustion of various waste materials. Other undesirable gases can also be found in incinerator flue gas. As a result of these problems, incinerator flue gases must be treated to meet various national and local air emission standards. Such treatment is expensive, and the high costs have strongly impeded the development of incineration as a way to recover energy values and reduce the volume of wastes sent for disposal by burial in landfills.

Incineration Technology

Incineration of MSW has been used for years. The Baltimore Refuse Energy Systems Company (BRESCO) has been providing disposal of up to 2,250 tons per day of municipal solid waste from Baltimore City, Baltimore County, and other areas in Maryland since 1985. Trash is incinerated in three parallel processing units, each with a furnace, a boiler, and an air pollution control system. This is moving grate system generating high-pressure steam, in excess of 500,000 pounds per hour at full capacity. The steam is used to generate up to 60 megawatts of electricity, up to 60 megawatts, and for district heating and cooling. BRESCO is capable of supplying up to 300,000 pounds of steam per hour to a district heating facility, which distributes the steam to buildings in downtown Baltimore. This waste-to-energy facility successfully reduces the volume of incoming waste by approximately 90%, and recovers ferrous and non-ferrous metals from the ash residue.

Energy recovery economics are said to be unfavorable because of the presence of large volumes of moisture during humid periods of the year.

A more recent facility in Long Beach, Calif., called SSERF, processes 1300 tons/day of MSW and generates some 50 MW of power in an extremely rigid air quality management district. This facility has the advantage of a mostly arid climate, improved environmental engineering techniques, and local support subsidies.

Economics for many of these projects in the 1970s and early 1980s were based on the high value of the energy produced. At that time the potential shortage of U.S. landfill options was not a factor. Federal, state, and municipal governments and private investors funded these and other similar waste recovery schemes as alternative fuel plants.

Thermo-chemical Conversion Processes

The patent literature is rich with examples of processes that have been conceptualized and developed for non-incinerating thermal conversion of wastes and other organic solids to make mixtures of gas, liquid, and (usually) char products. Most of these gasifiers use a combination of chemical gasification of feed material and pyrolytic cracking of the feed material molecules. The chemistry of these processes is well established and verified.

Pyrolysis is commonly defined as thermal decomposition in an environment of less-than-stoichiometric oxygen; thus, partial oxidation reactors have been placed lumped under this category. The funded projects can be split into two subcategories—those that employ some form of organic combustion and those that do not. The former category of projects was mostly coal-based gasification projects, which used direct (though incomplete) combustion of feed material to generate the necessary reaction heat. The latter processes use externally derived heat, often from solar or nuclear generated sources. A study of such processes provides guides to materials of construction, performance, and perhaps some decomposition kinetic rate, and yield chemistry.

In addition, several of these processes heat the organic feed material only to the point of leaving a carbon-ash composite solid as a reactor product/waste. Some of the more advanced, and most technically viable, processes utilized this residual char material as fuel for burning (usually within the process but outside the reactor) to generate the required process reaction heat. An example of this was the Garrett Process developed by Occidental Petroleum, creating a gas, a foul-smelling oil with low BTU value, and a char (U.S. Pat. Nos. 4,153,514, 4,162,959, 4,166,786, to Garrett, Mallan, Durai-Swamy, etc.). The char was burned outside the pyrolysis reactor to generate the required heat, and the resulting hot char was recycled to heat the incoming feed. Other processes used pure oxygen or oxygen-enriched air to increase the temperature at the bottom of the reactor, since standard air combustion will realistically allows for only about a 1800 or 2000° F. maximum reactor temperature. Oxygen-enrichment also reduces the problems associated with having nitrogen in the reaction system, these primarily being NOx formation and reduction of final gas heating value.

Depending upon the composition, ash will melts into a viscous slag phase at temperatures of 2000 to 2700° F. Metals will melt from 1500° F. to as high as 3700° F. (tungsten), often necessitating oxygen-enriched combustion air in order to obtain the reaction temperatures needed to recover ash and metals as melts and properly gasify the carbonaceous and other volatile material in the char.

In most of these thermo-chemical processes, the volume of solid by product is 2 to 4 percent of that of incoming refuse, depending upon the amount of noncombustible materials in the mixed wastes. By contrast, a well-designed and efficiently-operated conventional incinerator produces a solid residue of 10% or more of the volume of refuse burned.

Indirectly-Related Technology

A number of processes demonstrate the chemical validity of thermochemical conversion technology. Some of the processes employ different technologies. All of the pyrolysis processes generate gaseous products, often containing mixtures of carbon monoxide (CO) and hydrogen ($H_2$). This mixture is known in the industry as synthesis gas, with the name often shortened to syngas. When the product also contains a large fraction of $CO_2$, $H_2O$, and any of a variety of other gases and vapors, it is called pyrogas. Several commercially proven process alternatives are known for converting syngas and pyrogas to clean products. Most of these require significant removal of $CO_2$ and other acid gases formed in the reaction processes. Such $CO_2$ removal adds cost and complexity to the processes.

The processes dealing with pyrolysis of a municipal or other organic waste material have been scrutinized and the most relevant ones discussed below.

Slagging Coal Gasification & Pyrolysis Processes

The earliest thermo-chemical processes involved coal gasification. Many related pyrolysis processes describe methods and apparatus for pyrolyzing coal, or were derived from such processes. For example, U.S. Pat. No. 5,034,021 (Richardson) discloses pyrolysis of coal using a counter-current reactor system, with solid feed flowing downward and hot gas flowing upward. Pyrolysis char product may optionally be gasified in a hotter second section of the reactor to provide hot synthesis gas for reaction with the feed coal to increase liquid yields. In this invention, the gasifier operates in the oxidation mode, with air or oxygen used to convert the carbon values in the char to carbon oxides, with release of heat. The pyrolysis section operates with a maximum temperature of about 850° F. to maximize production of liquids.

Gasifiers are generally classified as those discharging gas and solid char/inorganic matrix material or those that produce a liquid inorganic melt called slag. The method of the current invention is to produce and collect slag.

U.S. Pat. No. 4,121,912 (Barber et al.) describes a pressurized slagging gasifier integrated with an expansion turbine/compressor system that is driven by the gasifier pressure. This reactor, which became the Texaco process, oxidized any number of hydrocarbonaceous feeds (gas, solid-gas slurries, gas-liquid slurries, organic liquids) with an oxidant stream at the inlet of the gasifier chamber. The combustion products were mixed and expanded in the chamber to drive the rotating equipment for the process and gas cleanup system. The process still provided direct oxidation of any solids such as coal and was never well adapted for heterogeneous solid wastes.

U.S. Pat. No. 4,340,397 (Schulz) describes a different type of slagging gasifier for coal or organic wastes. One feature of this design is the addition of oxygen within the gasifier to generate heat by partial combustion of feed materials.

Coal gasification technology was readily adopted for biomass conversion. U.S. Pat. No. 5,226,927 (to Rundstrom) describes a gasifier for direct partial oxidation of wood material. U.S. Pat. No. 4,497,637 (Purdy et al.) describes a thermochemical converter for pyrolysis and gasification of wastes.

Tapping of Slag

Removal of liquid slag material has been a common operation in blast furnaces for over a hundred years. A few patents have been issued with specific regard to gasification reactors. U.S. Pat. No. 3,985,518 (Anderson) describes a tapping method for what became the PUROX gasifier, though Union Carbide later opted to use a water quench system. U.S. Pat. No. 5,425,791 (Tanca) describes a circular slag tap for gasifiers.

Indirect Heating Processes

Several patents use product gases as fuel for indirect contact heating of the pyrolysis chamber, for example, i.e., heating the chamber rather than passing the hot gases directly against the pyrolysis feed. U.S. Pat. No. 3,884,161 and the related U.S. Pat. No. 3,884,163 (both to Borge et al.) describe controlled combustion processes for reducing the volume of urban and industrial wastes, with energy from burning liquid organic materials providing the heat to dry the feed in a separate vessel. Dried feed is further heated to pyrolysis temperature by heat from combustion of pyrolysis products in a separate zone of the same system. U.S. Pat. No. 4,774,895 (to Christman) teaches the treatment of wastes in an indirectly heated pyrolysis reactor and passing the product gases and vapors directly to an incinerator. U.S. Pat. No. 4,247,367 (Tamura et al.) again uses indirect heating by combustion of product char with; many other twists on recovery and treatment of products. U.S. Pat. No. 4,217,175 and the related U.S. Pat. No. 4,261,795 (both to Bertram) teach indirect heating by combustion of product char and feed wastes. It includes methods for recovery and treatment of products. U.S. Pat. No. 5,425,792, U.S. Pat. No. 5,656,044, and U.S. Pat. No. 5851246 (all to Bishop et al.), describe somewhat more sophisticated rotary kiln or rotary shaft reactors for indirect heating.

Molten Bath Processes

Even more recent patents tend to induce high pyrolysis temperatures via primarily non-combusting means, though in some of the patents, an oxidant (typically oxygen) may be added to assist in the overall reaction. U.S. Pat. No. 5,359,947 (Wagner et al.) describes pyrolysis of various waste materials in a molten metal bath at about 800° C., with the product gas burned in a separate system. Heat is applied externally using gas burners or electrical means. This patent also teaches the pyrolysis of prepackaged wastes. U.S. Pat. No. 5,461,991 (Wagner et al.) also employs molten metal alloys to pyrolyze hazardous liquid waste. U.S. Pat. No. 5,704,557 (Hallett et al.) and U.S. Pat. No. 4,684,402 (Geskin et al.) both use a molten bath of metal or other high-melting material for pyrolytic destruction of wastes. Complex mechanical systems are required for most of these molten metal processes to contain the gaseous products and direct them back through to the process.

Plasma/Electric Arc/EMR Processes

U.S. Pat. No. 5,387,321 (to Holland) uses microwave EMR heating, adding scrap tires and the like as absorbers for the microwave energy. U.S. Pat. No. 5,487,873 (Bridges et al.) uses radio frequency EMR to accomplish pyrolysis in an oxygen-free atmosphere. U.S. Pat. No. 6,155,182 (Tsangaris et al), U.S. Pat. No. 6,018,471 (Titus et al.), and U.S. Pat. No. 5,280,757 (Carter et al.) discuss methods of using plasma arc technology for driving the pyrolysis of the organic feed material. U.S. Pat. No. 5,069,765 (to Lewis) and U.S. Pat. No. 4,472,245 (to Halm) describe similar electric arc methodologies to accomplish the same end. All these types of reactors using EMR, plasma generation, or electric arc methods are limited in throughput capacity to just a few tons/day and have been used economically only for destruction of high expensive disposal cost trash such as medical, industrial hazardous waste, and nuclear wastes. U.S. Pat. No. 4,831,944 (Durand) describes a vertical shaft reactor with a plasma generator feeding hot gas from below.

Fluid Bed Gasification Processes

A number of processes use a fluidized bed reactor in the gasification process. Most of these processes try to gasify the residual char from a separate pyrolysis process or directly try to gasify coal or coke with steam or via direct partial oxidation. A few others will attempt partial oxidation and pyrolysis in the same reactor. FBG processes are by their very nature low temperature processes since slagging would destroy the fluidizing characteristics of the reactor.

Recent improvements in fluid-bed process technology have given rise to a number of waste processes using primarily air-blown or oxygen-blown combustion of the feed solids and/or char in fluid bed combustors. Typical of these are U.S. Pat. Nos. 4,592,762 and 4,699,632 (to Babu et al.) and U.S. Pat. Nos. 5,922,090, 5,980,858, 6,190,429, and 6,676,716 (all to Fujimara). The Fujimara patents are the basis for the current Ebara gasification process.

Less common approaches use direct feed fluid bed pyrolyzers using extremely lean partial oxidation (U.S. Pat. No. 3,853,498 to Baillie and U.S. Pat. No. 4,448,589 to Fan et al.) or steam (U.S. Pat. No. 4,032,305 to Squires) with pyrofluids and char as typical products.

Feed Assistance Methods

Several processes require some sort of mechanical feed assistance. U.S. Pat. No. 6,067,915 (Sharpe) uses a ram feed system to promote efficient feeding of their reactor. This patent has become the current Compact Power process. U.S. Pat. No. 5,311,830 (to Kiss) also describes the use of a compactor ram for feeding trash to an oxidative gasifier. This patent is now incorporated into the Thermoselect gasification process. U.S. Pat. No. 4,412,889 (to Oeck) uses an impellor based auger pump mechanism. Feed assistance is often required when multiple reactor units/vessels are employed. U.S. Pat. No. 6,736,940 (Masenone) describes such a case.

Inert Contact Heat Carriers

One unique way of providing heat to the reactor solids is to contact them with externally generated hot solids. U.S. Pat. No. 5,423,891 (Taylor) describes a method for contacting solid waste materials with hot carrier solids. U.S. Pat. No. 4,002,438 also uses hot solids mixed with waste to effect pyrolytic reactions. This method was derived from early German coal gasification methods that were adapted in the 1970s for the retorting of oil shale.

Batch Processes

Several of the indirect heating processes are batch or semi-batch methods with discrete processing steps required as a part of the procedure. U.S. Pat. No. 6,133,328 (to Lightner) describes a batch process for gasifying biomass. U.S. Pat. No. 4,977,840 (to Summers) describes a process whereby a batch process is started by injecting flue gas into the reactor to begin the heating cycle. This patent is the basis for the commercial plant utilized by Statewide Medical in Indianapolis, Ind. to destroy medical waste. It might be considered as a partial batch analog to the chemistry employed by this invention. An evaluation of the environmental impact of this process by the EPA is enclosed in the references found in the Appendix of this invention description.

Catalyst Promoted Thermochemical Processes

A small percentage of the patents in this field describe utilization of catalytic enhancements. The presence of various chemical and metallic components in the ash and slag have been known to contribute to the gasification and reforming reactions in the both pyrolysis and gasification sections. Iron promotes the reforming of hydrocarbons but also the formation of dioxins and furans.

U.S. Pat. No. 4,865,625 (Mudge et al.) describes an embedded catalyst entrained with the solid feed. U.S. Pat. No. 6,120,567 (Cordell, et al.) teaches the injection of catalyst in with the solids to promote the gasification reaction. U.S. Pat. No. 5,895,508 (to Halow) uses a method of catalyst recycle from the ash.

Directly Related Technology

The primary claims for this invention comprise the use of an upward draft, vertical shaft, slagging reactor, with a water-rich high-temperature driver gas generated externally to the reactor with partial oxidation of a hydrocarbon fuel. The oxygen-free driver gas then converts the pyrolytic char residual to a hot syngas that provides the thermal and convective medium to drive the main pyrolytic reactions, in a chemically reducing environment, in the dried organic feed material. The process also allows for dry feed or a limited amount of liquid feeds such as which might be obtained by recycle of pyrolysis products Some prior patents have elements in common with this invention. None, however, have the unique combinations of this invention and none address the generation of high temperature, moist, oxygen-free driver gas in the manner of this invention.

Vertical Shaft Reactors

Vertical shaft updraft reactors have been well used in thermo-chemical conversion of organic material.

U.S. Pat. No. 4,406,744 (to Berg) describes pyrolysis of coal in a vertical reactor where the coal flows downward through successively hotter zones, with hot gas (generated by air-blown combustion) flowing up through the bed. Liquid products (hydrogenated tars and naphtha) were the goal in this process, hydrogenated tars and naphtha, and if the reactor operates at lower temperatures to maximize their production. The byproduct coke was claimed to have reduced sulfur.

U.S. Pat. No. 4,465,556 (Bowen, Purdy, et al.) describes the pyrolysis and gasification of organic materials in a vertical shaft reactor, with downward flow of feed material. In this system, there is a complex set of inlet ports for drying gas, thermal treatment, gas, oxidant (air and/or oxygen), and heat recovery gas. Each such port is fit with temperature and flow controls for detailed control of the process. This complex system generates gas, liquid, and solid char products, primarily charcoal.

U.S. Pat. No. 4,003,683 (Powell et al.) and U.S. Pat. No. 3,962,582 (Greschat, et al.) first describe slagging vertical pyrolysis chambers with waste flowing downward in the presence of oxygen to provide needed heat. Slag product from the process is removed from the bottom of the reactor. Product gases are burned to generate electric power and produce steam as a byproduct.

Similar patents resulted in the Union Carbide PUROX process that was successfully piloted in the 1980's. The PUROX System (covered by U.S. Pat. No. 3,729,298 and subsequent U.S. Pat. Nos. 3,801,082 and 3,985,518—all to Anderson, and U.S. Pat. No. 4,291,636 to Bergsten et al.), developed by Union Carbide Corporation, utilizes oxygen, instead of air, to produce high-temperature incineration and pyrolysis of all types of refuse. The reactor is a vertical shaft furnace into which refuse is fed through a charging lock at the top. Oxygen is injected into the combustion zone at the bottom of the furnace where it combusts with carbon char residue from the pyrolysis zone at a high enough temperature to product slag. The molten material continuously overflows from the hearth into a water quench tank where it forms a granular product. The hot gases formed by the reaction of oxygen and carbon char rise through the descending waste. In the middle portion of the vertical shaft furnace, organic materials are pyrolyzed under an essentially reducing atmosphere to yield a gaseous mixture high in carbon monoxide and hydrogen (typically about 50% CO and 30% $H_2$ by volume on a dry basis). As the hot gaseous products continue to flow upward, they dry the entering refuse in the upper zone of the furnace. The high thermal efficiency of the PUROX System is indicated by the relatively low temperature (about 200° F.) of the by-product gas exiting through a duct to the gas cleaning section of the system. As it leaves the furnace, the gas mixture contains water vapor, small amounts of acid gases, some oil mist formed by the condensation of high-boiling organics, and minor amounts of fly ash. All of these are removed by conventional cleaning technologies. The final product gas of the PUROX System was essentially sulfur-free and contains far less than the amount of fly ash allowable under federal air quality standards. A detailed description of the PUROX system can be found in the reference section of the Appendix of this invention.

U.S. Pat. No. 4,052,173 (previously cited, to Schultz) describes a process for gasification and pyrolysis of primarily a coal-based feed supplemented with municipal solid waste. It was an attempt to overcome the solid flow problems of pure MSW flow in the PUROX reactor. The reactor is a shaft-type or blast furnace type with down-flow of solids against an up-flow of hot driver gas.

The driver source gas consists of steam supplemented with an oxygen-enriched air. The primary heat source comes from burning of the charred pyrolytic remains to generate heat and combustion products, which flow upward through the solids bed. The patent contains strict guidelines on the ratio of coal to MSW, on the ratio of oxygen in the driver gas, and on the amount of steam fed with the driver gas or into a secondary feed port to the gasification section of the reactor. The control object was to produce strictly syngas with specific ratios of carbon monoxide to hydrogen ratios.

In addition, for U.S. Pat. No. 4,052,173, the original solids feed port also has some intrinsically problematic safety considerations for injecting solids into a reactor with large amounts of CO, hydrogen, and other flammables. This patent also requires the use of a primarily coal-based feed to ensure a minimal bed permeability and requires the use of non-caking coals for direct injection to minimize bridging problems. Subsequent developments of this process are now listed for commercial sale as the "Simplex Process."

The following list shows other patents that utilize a shaft reactor with heat primarily or substantially generated by direct oxidation of char and/or primary solid feed:

U.S. Pat. No. 3,820,964 (to Janka)
U.S. Pat. No. 3,926,582 (to Powell et al.)
U.S. Pat. No. 4,078,914 (to Gold)
U.S. Pat. No. 4,152,122 (to Feldman)
U.S. Pat. No. 4,493,171 (to Stahlhut)
U.S. Pat. No. 4,776,285 (to Wallner et al.)
U.S. Pat. No. 5,486,269 (to Bengt et al.)
RU 2,150,045 (to Manelis et al.)
DE 10059367 (to Mallon)

JP 10153309 (to Yamagata et al.)
JP 20033566340 (to Yoshihiro.)

The last patent in the list is owned by Nippon Steel, which has the only process that is currently operating with large commercial tonnages of MSW. The process requires that petroleum coke be combusted by oxygen to generate the heat for the process in which MSW is a secondary feed.

Liquids Recycle

Several patents use recycling of produced liquids. U.S. Pat. No. 4,960,440 (to Betz) teaches the recycling of process-derived water to the process to reduce the level of noxious organic compounds dissolved in the water. This applies to the water that is condensed in the step of recovering oil, while the remainder of the water vapor passes through to be vented or otherwise treated. U.S. Pat. No. 4,373,995 (Bowen et al) teaches the recovery and recycle of pyrolysis oils and liquids from a moving bed pyrolysis process. In this process, the oils are filtered to remove suspended solids, with the filter cake recycled to the pyrolysis reactor. It also teaches the recovery and recycle of pyrolysis liquids to the reactor. U.S. Pat. No. 4,315,757 (to Woodmansee) describes a method for recycling tars from coal gasification. U.S. Pat. No. 6,662,735 (Tischer) describes a methodology of putting injector ports into the hot zones of a reactor.

Oxygen-Free Driver Gas and Reactor Operation

Exclusion of free oxygen in the conversion reactor has been a goal of several thermochemical processes. U.S. Pat. No. 5,411,714 (Wu, et al.) uses an evacuation process on the feed material. U.S. Pat. No. 4,235,676 (to Chambers) and several others (listed above) provide for a continual purge of inert gas in with the feed material, though this tends to dilute the calorific value of the product gas. Processes using a lock hopper or rotary feeder are capable of using an inert purge gas for this feed equipment. Good practice of the design art would certainly require such usage. High-pressure processes must claim that leakage, if any, will occur outward from the reactor, in spite of potential toxic and flammability problems with such outgassing.

Some patents use a heated external driver gas that does not contain oxygen. Almost all of them direct this gas directly against the feed material rather than to gasify pyrolytic chars. U.S. Pat. No. 4,536,603 (Sprouse, et al.) teaches how to generate acetylene from coal by using direct contact of a hot hydrogen gas stream. US Appl. 2002/0113228 (Kim) teaches generation of a driver gas used directly against high molecular weight feed materials for simple thermal breakdown of the solids and claims the method is only applicable for coal, tars, and waste oil. U.S. Pat. No. 6,048,374 (to Green) describes the use of the combustion products of partial oxidation of a recycle gas to heat both a pyrolytic and gasification section contained in tubes, not fed directly against the reactor contents. This is would thus be truly an indirect heating process.

U.S. Pat. No. 6,790,383 (to Kim) claims only the burning of syngas to form $CO_2$ and water. It directs this water directly against carbonaceous feed materials such as coal or coke to form CO and $H_2$, then recycles part of this produced syngas to repeat the cycle. The process requires the complete combustion of the driver gas and assumes that all of the feed material will simply form CO and $H_2$.

Pure steam has been used as a driver gas. U.S. Pat. No. 4,183,733 (to Jager) first uses steam directly on petroleum coke to generate a hydrogen-rich gas. U.S. Pat. No. 4,229,184 (to Gregg) and U.S. Pat. No. 3,993,458 (to Antal) use solar energy to heat steam and also provide high enough temperatures in the reaction zone for the steam to directly gasify coal or other carbonaceous materials. U.S. Pat. No. 5,771,483 uses just externally generated steam as the driver gas and can therefore only reach reaction temperatures of 900-1500° F. due to limits of commercial boiler temperatures.

U.S. Pat. No. 4,831,944 (Durand, previously cited) teaches the use of a plasma torch at the bottom of a vertical shaft reactor to generate the high temperatures needed for waste destruction.

U.S. Pat. No. 5,064,444 (Kubiak et al.) teaches the concept of using an externally heated (by fired heater combined with gas-gas recuperative exchange with the stack gas from the furnace.) recycle gas and steam to form the driver gas. This process will only reach reaction temperatures of 900-1700° F. (claimed) due to limits of commercial technology for boiler and fired heater temperatures.

A blatant knockoff of this process was put out on the following web site: www.purwox.com which purported to be able to heat the recycle gas in a gas-gas exchanger to nearly 3700° F., or approximately the melting point of tungsten and over a thousand degrees above the melting point of iron. There is no material commercially available for this sort of heat exchange under any sort of reasonable working pressures that can be built in an economic manner. For this reason, PHREG chose direct, controlled combustion of a fuel as the means of high temperature and driver gas water content attainment.

Partial Oxidation of a Gas Stream for Composition Control

One very simple way of removing oxygen from a combustible gas stream is to oxidize a portion of the fuel with a less than stoichiometric amount of oxygen, typically as close to 50% as possible. Steam is also added to the combusted gases in deliberately controlled quantity. This process reaction, known as gaseous partial oxidation (POX), is quick, complete (in terms of oxygen removal extent), and generates significant heat as it is highly exotherhermic. It is the basis for an industrial manufacturing process called autothermal reforming in which the object is to generate carbon monoxide and water and, then react these two materials at high temperature over a suitable catalyst to manufacture hydrogen in targeted amounts relative to the CO. Several patents that cover autothermal reforming are listed in the literature. U.S. Pat. No. 6,662,735 (to Sederquist) is typical. The equipment, process, and operations control of the gaseous POX scheme in autothermal reforming is well established to those versed in the art.

All patents, US and foreign, referenced in this document are hereby incorporated by reference in their entirety.

BRIEF DESCRIPTION OF THE INVENTION

The PHREG process of this invention typically uses POX of a gaseous fuel stream, similar to that used in auto-thermal reforming, to generate all or part of the driver gas into the bottom of the gasification/pyrolysis reactor. The object of our POX method is to generate enough water and temperature to drive the char gasification and provide the heat of pyrolytic decomposition without having to actually combust either the char or the organic feed material itself. We believe this to currently be a unique concept for large scale, continuous, thermo-chemical conversion of organic materials in a high throughput vertical shaft reactor.

The gasification is accomplished by using a hot water (steam)-laden driver gas. This driver gas is generated by a controlled combustion of recycle fuel gases. These recycle feeds can optionally be mixed with an externally derived natural gas or other fresh fuel, in a self-contained burner. This provides a very high temperature, wet gas to the base of the shaft reactor that flows upward through the descending solid feed, providing the thermal and chemical driving forces for the gasification and pyrolysis reactions.

The process takes place in a single gravity-driven (downward flow of solids), moving bed shaft reactor with an updraft gas flow. Solid feed material is fed to the top of the reactor and molten slag is removed from the bottom. The overburden of several feet of solids above the reaction zone has three basic functions:

1. It keeps the reaction zone in a stable position.
2. It filters out pyrolyticly generated particulates (soot).
3. It acts as a direct contact counter-current heat exchange medium with the hot gases providing convective heat transfer to the solids.

After this non-vapor phase removal is complete, the gas can be dehydrated and treated for removal of acid gases (such as $CO_2$, $H_2S$, HCl, HF, organic acids) formed in the reactor. The methodology and equipment necessary to do this is well know to those skilled in the art of gas processing.

The reaction process can be run in two modes:
1. "Once through" fashion with fresh fuel from offsite being used exclusively to generate the thermal driver gas.
2. "Self sustaining" mode with 25-100% of the product gas recycled as fuel to the gas combustors to provide the thermal driver gas for the pyrolysis and gasification reactions.

Slag formation will occur on the lower edge of the reactor's hot zone, and will take place at a temperature of incipient fusion. One common method of removing such a material is to collect it in a sump of the reactor hearth, which is drained periodically by means of a tap-drill boring a notch through a plug of fireclay. When the flow diminishes to a constraint value as the reservoir empties, a fresh plug of fireclay is introduced by means of a mud-gun, which exerts sufficient hydrostatic pressure to reverse the flow of the slag.

The material, which flows from the slag notch, is typically poured out onto a "beach" of sand, and then sprayed with water from "rainbird" type sprinklers to aid in quenching. The cracked and broken solid is typically granulated prior to collection by a front-end loader for removal and further processing. A variation of this collection method is to run the melt into refractory or sand-cast molds to make bricks, blocks, or other forms suitable for the cooled vitrified material. Other means of slag recovery are available as well.

A second feasible means of slag extraction involves the hot melt being dropped through saturated steam to a water bath, producing instantaneous granulation and quenching. A rake mechanism, such as a drag chain conveyor, is then employed to continuously remove the slag byproduct from the quench bath.

The production of a hot, wet, anaerobic driver gas is the key to the PHREG process. This driver gas provides the all of the thermal and chemical driving forces necessary for the reactions to proceed. Fuel of adequate hydrogen content and net combustion BTU value is mixed with air and/or supplemental oxygen, burned under strict process control in an external combustor to generate the necessary high temperature for the gas. This thermal driver gas, which can optionally be mixed with steam or other hot streams, is injected through tuyeres into the base of the reactor shaft.

No significant free oxygen is present in the reactor. This eliminates any possibility of forming direct emissions of dioxins, furans, or other complex pollutant materials. The high rate of gas flow in the reactor prevents secondary formation of these pollutants (reaction of the gas components with the feed solids) by minimizing the residence time of reactions in the critical temperature range of 300 C-600C. Further, complex organic pyrolysis products, which are condensed outside the reactor, are removed and recycled to the gasification or the high temperature pyrolysis sections of the reactor.

Conversion efficiency of municipal solid waste energy potential (combustion LHV content of dry material) to product pyrogas heating value is approximately 85-90% depending upon the composition of the entire feed material. This energy analysis includes the consideration of energy content associated with supplemental steam addition, the energy of compression in the product gas handling systems, and reasonable allowances for heat losses to the surrounding environment.

The PHREG reactor must also be considered in terms of its capability for self-sufficiency or sustainability. Zero sufficiency implies total usage of fresh fuel to drive the reactor. 100% sufficiency implies that at least enough product gas is manufactured to serve as the sole driver gas generation fuel to the reactor combustors. Depending upon the combustion value of the feed, self-sufficiency will require a 25%-100% recycle of the net product gas to the combustors. The minimum net combustion value of the feed must be approximately 3000 BTU/lb to achieve 100% sufficiency.

The reactor can also be run at intermediate percentage levels of sufficiency. This characteristic allows the reactor operator to respond to changing economic conditions that might call for greater or lesser net gas capacity output. A typical application for this characteristic might be the ability to use fresh feed to generate the maximum amount of output gas for a gas turbine based power generator during peak power loading times (typically mid day to early evening). Local power companies in most developed municipalities reward incremental power production at spot market rates that often reach three times the base-load contract rate. A PHREG reactor delivering enough gas at about 50% product gas recycle to run a 25 MW generator could permit the peak loading generation of roughly 42-45 MW of power if no recycle is used and the product gas is used entirely for power generation.

Normal operation at 100% self-sufficiency will typically be a base load situation. The PHREG reactor only has the capability for a 10-15% turndown factor. Shutdown and startup of the reactor require several hours to several days to accomplish.

DETAILED DESCRIPTION OF THE INVENTION AND PREFERRED EMBODIMENTS

Figure 1:
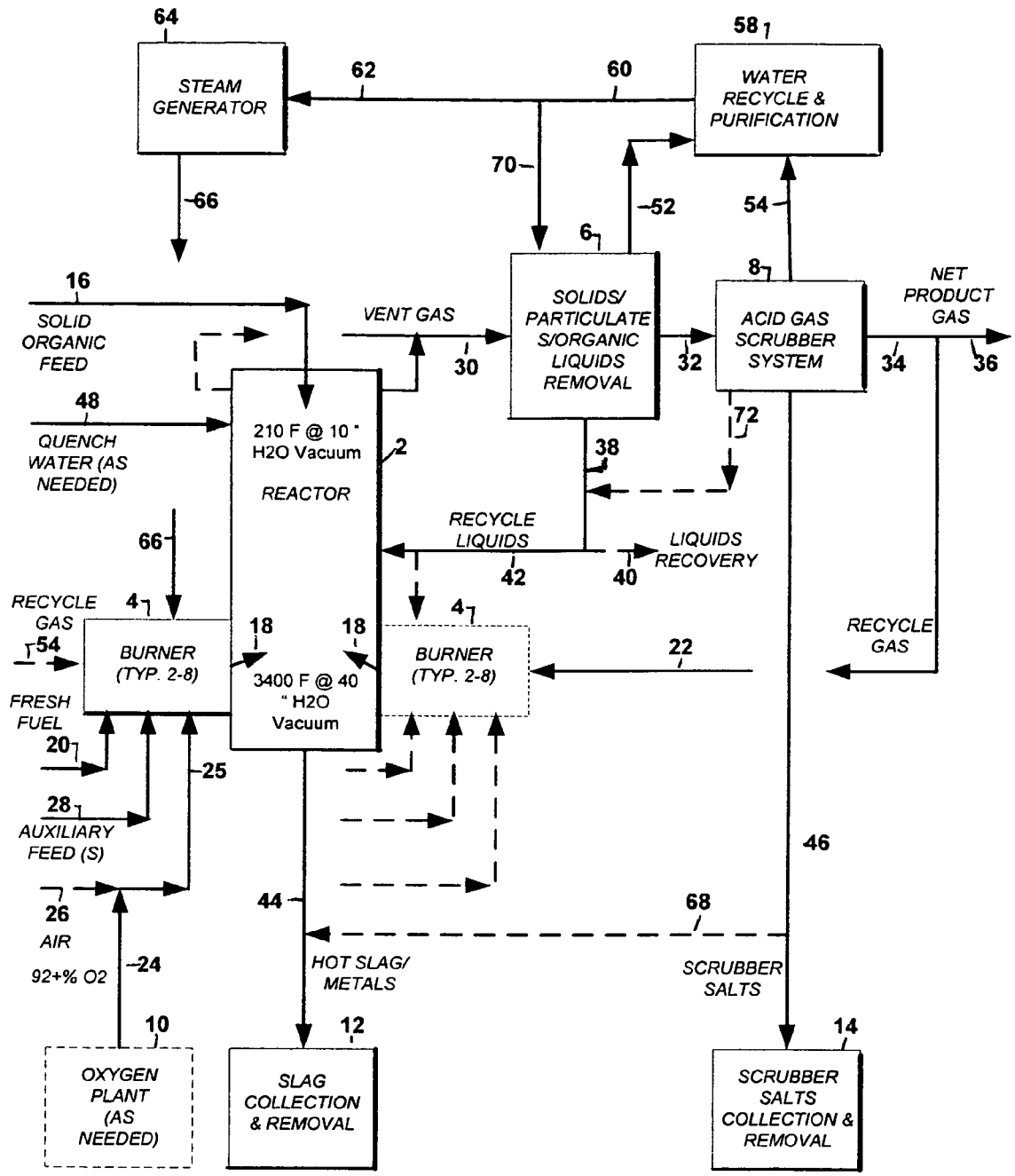
FIG. 1 is a simple block diagram of the expected overall process scheme with the reactor and the product handling processes. The process flow scheme for handling the reactor product gases is not claimed as a part of this invention. There are several alternative ways of processing and cleaning this gas that can be readily constructed by those skilled in the art. The description of the product gas handling is included for completeness of concept.

This invention relates to processes for recovering energy and chemical values from waste materials that contain organic chemical constituents. More particularly, it relates to processes to generate primarily hydrocarbon fuel gas from solid wastes such as post-consumer/municipal garbage and such materials as used tires, wastes from petroleum production and refining, wastes from growing and processing plants and animals as foods, sewage sludge, and a variety of other organic waste materials from potentially thousands of types of industrial, agricultural, and municipal sources.

A listing of all Tables for this invention follows in the paragraphs of this section.

Table 1 shows the composition of a typical MSW stream diverted to landfill in Los Angeles for the year 2000. The net combustion value (LHV) of this particular material is about 4500 BTU/lb on a surface-dry basis.

TABLE 1

Typical Los Angeles County Landfill Material - Year 2000

| Material | Type | Wt % - Dry Feed |
|---|---|---|
| Cardboard | Paper | 2.4 |
| Kraft Paper | Paper | 1.0 |
| Newspaper | Paper | 3.3 |
| High Grade Paper | Paper | 0.6 |
| Magazines | Paper | 1.0 |
| Phone Books | Paper | 0.4 |
| Other Mixed Paper | Paper | 1.3 |
| Waste Paper | Paper | 4 |
| CRV/PET | Plastic | 0.4 |
| HDPE | Plastic | 0.7 |
| PVC | Plastic | 0.3 |
| Film Plastics (LDPE) | Plastic | 1.3 |
| Polypropylene (PP) | Plastic | 0.3 |
| Polystyrene (PS) | Plastic | 0.6 |
| Rubber | Plastic | 1.2 |
| Tires | Plastic | 1.2 |
| Other Plastic | Plastic | 1.4 |
| Yard Waste | Organics | 10.9 |
| Food Waste | Organics | 22.6 |
| Wood Waste | Organics | 1.4 |
| Textile | Organics | 5.6 |
| Leather | Organics | 2.3 |
| Misc. Organics | Organics | 3.4 |
| Aseptic Packaging | Other | 0.4 |
| Disposable Diapers | Other | 10.8 |
| Asphalt | Other | 0.5 |
| Glass | Glass | 5.2 |
| Aluminum | Metals | 0.5 |
| Ferrous Metal | Metals | 2.5 |
| Other Metals | Metals | 0.8 |
| Concrete | Inerts | 2.7 |
| Clay, Brick, Rock, Sand, Soil | Inerts | 3.5 |
| Other Inerts | Inerts | 3 |
| Paint | HazWaste | 0.3 |
| Motor Oil | HazWaste | 0.5 |
| Lead Acid Batteries | HazWaste | 0.5 |
| Other Household Waste | HazWaste | 0.5 |
| Ash | HazWaste | 0.5 |
| Dead Animals | HazWaste | 0.2 |
| Total - Surface Dry Basis | | 100 |

Such wastes may have combustion values up to 6000 BTU/lb as delivered to landfill. The quality and composition of MSW is highly dependent upon the normal local culture and recycling policies in force at the dumping location. The energy value is often enhanced with paper, plastics, and waste oils. Such augmented fuel qualities can be as high as 9000-10000 BTU/lb. Table 2 shows typical energy of combustion values for typical MSW components.

TABLE 2

Typical Heating Values of MSW Constituent Materials

| Material | Type | LHV Combustion Value (BTU/lb) |
|---|---|---|
| Cardboard/Kraft Paper/Newsprint | Paper | 6233 |
| High Grade Paper/Magazines/Phone Books | Paper | 5446 |
| Other Mixed & Waste Paper | Paper | 5481 |
| CRV/PET | Plastic | 13200 |
| HDPE, LDPE, PP | Plastic | 13800 |
| PVC | Plastic | 8000 |
| Polystyrene (PS) | Plastic | 17700 |
| Rubber/Tires (w/o metal) | Plastic | 8443 |
| Other Plastic | Plastic | 12000 |
| Yard Waste | Organics | 4500 |
| Food Waste, Dead Animals | Organics | 3265 |
| Wood Waste | Organics | 6933 |
| Textile | Organics | 6595 |
| Leather | Organics | 8433 |
| Misc. Organics | Organics | 6600 |
| Disposable Diapers | Other | 4500 |
| Asphalt | Other | 14000 |
| Glass | Glass | 0 |
| Aluminum, Ferrous Metal, Other metals | Metals | 0 |
| Concrete, Clay, Brick, Rock, Sand, Soil, Ash, Other Inerts | Inerts | 0 |
| Paint | HazWaste | 200 |
| Motor Oil | HazWaste | 19000 |
| Lead Acid Batteries | HazWaste | 0 |
| Other Household Waste | HazWaste | 3000 |
| Municipal Solid Waste (MSW) | Avg. LA 2000 | 4560 |

This invention describes a method and process for Pyrolytic Heat Recovery Enhanced with Gasification (PHREG) that converts a wide variety of heterogeneous organic materials, comprised of such as municipal refuse, biomass, agriculture wastes, wood and forest product processing wastes, hazardous wastes, petroleum coke, coal or oil shale, individually or as mixtures, into valuable, high energy content gas. This gas is suitable for conversion to synthetic hydrocarbons, hydrogen, or other valuable chemicals or for burning to recover fuel values. It does this with a significant reduction in volume (approximately 20 fold) and weight (approximately 10 fold) of residual waste material. The process combines high temperature pyrolysis of a heterogeneous organic feed material, including some liquids, and gasification of the resulting carbonaceous pyrolytic char material using a hot steam-laden recycle gas.

The process takes place in a single, gravity-driven (downward flow of solids), moving bed shaft reactor with an updraft gas flow. Solid material is fed to the top of the reactor and molten slag is removed from the bottom. The overburden of several feet of solids above the reaction zone has three basic functions:

1. it acts as a direct contact counter-current heat exchange medium with the hot gases providing convective heat transfer to the solids
2. it filters out pyrolyticly generated particulates (soot and ash) and
3. it tends the keep the reaction zone in a relatively stable position, Controlled combustion of fuel gases, externally-derived natural gas or other fresh fuel, optionally mixed with recycle gas produced in the reactor, provides the thermal driving force for the gasification and pyrolysis reactions. The fuel gases are exothermically oxidized in a self-contained burner, which provides a very high temperature, wet gas to the base of the shaft reactor. This thermal driver gas flows upward through the descending solid feed.

Waste Organic Material Conversion Chemistry

According to a recent report a typical California urban trash composite formula, on an ash-free, surface moisture-free basis is:

$C_6H_{9.72}O_{3.36}N_{0.07}S_{0.01}$ and with a pseudo-average MW calculated as 199.63.

The relative amounts of ash and surface water in MSW fed to a PHREG unit will vary depending upon the location and weather, and upon the local recycling protocols. The non-glass, non-metallic inorganic mineral matter which will form ash can constitute from 5-30% of the feed weight. 10% is a typical average value unless the feed is full of construction and demolition waste, or highly filled composite organic material such as heavy duty paper or filled-plastic materials. Table 1, previously cited, shows the breakdown of a typical ton of trash sent to landfill in the year 2000 by the County of Los Angeles in California.

Adsorbed water percentages are even more qualitatively defined than ash amounts. Addition of sludge or use of open collection containers in wet weather will greatly affect the amount of water fed to a PHREG reactor. The ability to drain MSW through a feed belt conveyor or pre-dry some of the feed material may be necessary simply due to poor handling procedures of the waste collection company or simply from unavoidable moisture retention due to geographical circumstances. Water content will typically vary from 5-20% of the feed weight in most developed urban environments.

In a thorough pyrolysis reaction, one (1) carbon equivalent typically ends up in the char along with the inorganic ash components. During the feed drying/heat up process prior to pyrolysis, 0.69 moles of chemically bound $H_2O$ (about 5% by weight) are pulled from the matrix (by the hot gas) just before molecular cracking takes place. The net formula of the organic feed material that is completely pyrolyzed would then be:

$$C_5H_{8.34}O_{2.67}N_{0.07}S_{0.01} \rightarrow 1.4CO + 0.4CO_2 + C_{3.7}H_{7.17} + 0.47H_2O + 0.07NH_3 + 0.01H_2S \quad (1)$$

In the gasification section, however, the pyrolytic char is completely or nearly completely consumed by the following two reactions:

$$C + H_2O = CO + H_2 \quad \text{(2) Water gas shift reaction}$$

$$C + CO_2 = 2CO \quad \text{(3) Bouduart reaction}$$

These reactions create the reducing atmosphere present in the pyrolysis section. The temperatures at the gasification section inlet will typically range from 2500° F. to 3600° F. The endothermic nature of the reactions will result in a temperature decrease of about 450-750° F. degrees. Even at these outlet temperatures (2000° F.-3600° F.), the equilibrium pushes the reactions far to the right. The kinetics of the reactions at these temperatures are also such that the gas residence times in the gasification zone permits a 99+% approach to equilibrium.

Gaseous Reaction Chemistry

The gasification of char is accomplished by using a hot water (steam)-laden driver gas. This driver gas is generated by a controlled combustion of recycle fuel gases. These recycle feeds can optionally be mixed with an externally-derived natural gas or other fresh fuel, in a self-contained burner. This provides a very high temperature, wet gas to the base of the shaft reactor that flows upward through the descending solid feed, providing the thermal and chemical driving forces for the gasification and pyrolysis reactions.

Table 3 shows relative yields of syngas and pyrogas for a non-recycle process.

TABLE 3

Typical Composition of Pyrolysis and Syngas Generation
Once-Through/Peaking Mode
99.5% Oxygen Blown Reactor

| Name | Formula | Vol % | Wt % | Vol % | Wt % | Vol % | Wt % |
|---|---|---|---|---|---|---|---|
| Hydrogen | $H_2$ | 2.29 | 0.14 | 37.43 | 4.22 | 13.61 | 0.97 |
| Methane | $CH_4$ | 17.89 | 8.80 | 6.41 | 5.75 | 14.19 | 8.18 |
| Ethylene (Ethene) | $C_2H_4$ | 7.29 | 6.27 | 0.00 | 0.00 | 4.94 | 4.99 |
| Ethane | $C_2H_6$ | 4.08 | 3.76 | 0.00 | 0.00 | 2.76 | 2.99 |
| Propylene (Propene) | $C_3H_6$ | 6.79 | 8.78 | 0.00 | 0.00 | 4.60 | 8.99 |
| Propane | $C_3H_8$ | 2.78 | 3.76 | 1.27 | 3.13 | 2.29 | 3.63 |
| Butadiene | C4H6 | 5.35 | 8.89 | 0.00 | 0.00 | 3.63 | 7.08 |
| n-Butane | C4H8 | 3.64 | 6.27 | 0.00 | 0.00 | 2.47 | 4.99 |
| Benzene | $C_6H_6$ | 2.11 | 3.76 | 0.00 | 0.00 | 1.43 | 2.99 |
| Xylenes | $C_8H_{10}$ | 1.57 | 3.76 | 0.00 | 0.00 | 1.06 | 2.99 |
| Carbon Monoxide | CO | 1.93 | 6.27 | 0.00 | 0.00 | 1.31 | 4.99 |
| Carbon Dioxide | $CO_2$ | 38.50 | 33.09 | 51.08 | 80.01 | 42.56 | 42.66 |
| Water Vapor | $H_2O$ | 4.08 | 5.52 | 2.10 | 5.18 | 3.45 | 5.45 |
| Oxygen | $O_2$ | 1.69 | 0.94 | 1.71 | 1.73 | 1.70 | 1.10 |
| Sulfur | S | 0.00 | 0.00 | 0.00 | 0.00 | 0.00 | 0.00 |
| Sulfur Dioxide | $SO_2$ | 0.00 | 0.00 | 0.00 | 0.00 | 0.00 | 0.00 |
| Hydrogen Sulfide | $H_2S$ | 0.00 | 0.00 | 0.00 | 0.00 | 0.00 | 0.00 |
| Nitrogen | $N_2$ | 0.00 | 0.00 | 0.00 | 0.00 | 0.00 | 0.00 |
| Ammonia | $NH_3$ | 0.00 | 0.00 | 0.00 | 0.00 | 0.00 | 0.00 |
| Chlorine | $CL_2$ | 0.00 | 0.00 | 0.00 | 0.00 | 0.00 | 0.00 |
| Hydrogen Chloride | HCL | 0.00 | 0.00 | 0.00 | 0.00 | 0.00 | 0.00 |
| Totals: | | 100.00 | 100.00 | 100.00 | 100.00 | 100.00 | 100.00 |
| Percent of Total Waste Input: | | NA | 70.65 | NA | 16.74 | NA | 87.40 |

Major gas phase chemical reactions occurring inside the reactor include the following (in descending order of relative importance to the process):

Steam Gasification of Carbon Rich Solids $$C^*(\text{activated char}) + H_2O \rightarrow CO + H_2 \quad (1)$$

and $$C^*(\text{activated char}) + 2H_2O \rightarrow CO_2 + 2H_2 \quad (1A)$$

Hydrogen shift reaction $$CO + H_2O \rightarrow CO_2 + H_2 \quad (2)$$

Methanation/Shift Reaction $$2CO + 2H_2O \rightarrow CO_2 + CH_4 \quad (4)$$

Bouduart Reaction $$C + CO_2 \rightarrow 2\,CO \quad (3)$$

These reactions, particularly 1 and 2, create the reducing atmosphere present in the pyrolysis section. The temperature dependence of thermodynamic equilibrium of these reactions is well known to those familiar with the present art. Table 4 shows the temperature dependence of thermodynamic equilibrium of reactions 2 & 3.

TABLE 4

Solid Residue Compositions

| | Percent By Weight | |
|---|---|---|
| Material | Char | Slag |
| Metals, Magnetic | 5.49 | 6.60 |
| Metals, Nonmagnetic | 4.43 | 5.33 |
| Carbon | 18.74 | 2.25 |
| Glass | 18.06 | 21.72 |
| Solids, Inert | 53.28 | 64.10 |
| Totals | 100.00 | 100.00 |
| Gross % of Total Waste Input: | 29.35 | 24.40 |
| Gross Bulk Densities, LB/CUFT: | 71.84 | 75.51 |
| Gross Input Volume, CUFT/HR: | | 315.32 |
| Net % After Metals & C Removal: | 20.94 | 20.94 |
| Net Bulk Densities, LB/CUFT: | 51.44 | 51.44 |
| Net Output Volume, CUFT/HR: | | 25.44 |
| Net % Weight Reduction: | 79.06 | 79.06 |
| Net % Volume Reduction: | | 91.93 |

In addition, with the presence of any significant amount of water in the pyrolysis zone gases, there will occur additional shift and reforming reactions that tend to reduce any complex $C_xH_y$ or $C_xH_yO$ compounds to more CO, $CO_2$, $H_2$, plus a small amount of simpler hydrocarbon and oxygenated hydrocarbon gases.

Hydrocarbon Reforming $$C_xH_y + XH_2O \rightarrow XCO + (X+Y/2)H_2 \quad (5)$$

$$C_xH_y + 2XH_2O \rightarrow XCO_2 + (2X+Y/2)H_2 \quad (6)$$

Hydrogenation of Carbon Rich Solids $$C^*(\text{activated char}) + 2H_2 \rightarrow CH_4 \quad (7)$$

Hydrosaturation of unsaturated hydrocarbons $$C_xH_{2x} + H_2 \rightarrow C_xH_{2x+2} \quad (8)$$

The $C_xH_y$ composition is actually composed of several alkane, alkene, diene, and simple aromatic compounds that are described later in this document. The $C_xH_yO_z$ constituents are typically aldehydes, ketones, alcohols and ethers, all of which can be removed with water scrubbing. The presence of significant hydrogen in the pyrolysis gas tends to minimize the formation of these oxygenated compounds as well as the unsaturated hydrocarbon species.

Several hundred other gaseous reactions may occur but are less significant under normal conditions in the reactor. The gasification, shift, and reforming reactions dominate, yielding a rich syngas as the overhead reactor product. The actual equilibrium mixture is, of course, a function of the carbon/hydrogen/oxygen composition of the municipal waste feed which can vary quite significantly with location and time of year. There is, in addition, catalysis of several of the reactions by the metallic/non-organic components in the slag and char, an effect that hastens the achievement of thermodynamic equilibrium for the products.

The net yield of the valuable product gases will be primarily determined by the type and amount of organics in the feed material, which can be quantified by the net heat of combustion of the solid feed material. The higher the organic content of the feed, the higher this fuel value parameter, and the richer and greater the yield of net product gas.

Table 4 shows the yield and composition of the solid residues from the reduction of the material of Table 3.

TABLE 4

(repeated) Solid Residue Compositions

| | Percent By Weight | |
|---|---|---|
| Material | Char | Slag |
| Metals, Magnetic | 5.49 | 6.60 |
| Metals, Nonmagnetic | 4.43 | 5.33 |
| Carbon | 18.74 | 2.25 |
| Glass | 18.06 | 21.72 |
| Solids, Inert | 53.28 | 64.10 |
| Totals | 100.00 | 100.00 |
| Gross % of Total Waste Input: | 29.35 | 24.40 |
| Gross Bulk Densities, LB/CUFT: | 71.84 | 75.51 |
| Gross Input Volume, CUFT/HR: | 315.32 | |
| Net % After Metals & C Removal: | 20.94 | 20.94 |
| Net Bulk Densities, LB/CUFT: | 51.44 | 51.44 |
| Net Output Volume, CUFT/HR: | 25.44 | |
| Net % Weight Reduction: | 79.06 | 79.06 |
| Net % Volume Reduction: | | 91.93 |

Table 5 shows the yield and composition of the combined syngas and pyrogases of Table 3 with a minimal level of post-pyrolytic steam reforming of the pyrolysis gas.

TABLE 5

Typical Composition of Reactor Outlet Gas Under 100% Sustainability Mode with Minimal Reforming
95% Oxygen Blow Driver Gas Generation

| | Vol % | |
|---|---|---|
| Component | Min | Max |
| $H_2$ | 4.181 | 6.523 |
| Methane | 5.453 | 8.353 |
| Ethane | 1.546 | 4.802 |
| Ethylene | 0.163 | 0.220 |
| Propene | 2.574 | 0.519 |
| Propane | 1.054 | 4.218 |
| 12BD | 0.028 | 0.363 |
| Ibutene | 0.380 | 0.608 |
| Butane | 1.800 | 3.932 |
| Benzene | 0.595 | 0.693 |
| Oxylene | 0.732 | 0.852 |
| $O_2$ | 0.000 | 0.001 |
| $N_2$ | 1.011 | 1.178 |
| $H_2O$ | 6.247 | 7.279 |

TABLE 5-continued

Typical Composition of Reactor Outlet Gas Under 100% Sustainability Mode with Minimal Reforming
95% Oxygen Blow Driver Gas Generation

| Component | Vol % | |
| --- | --- | --- |
| | Min | Max |
| $CO_2$ | 4.413 | 15.783 |
| CO | 30.803 | 47.541 |
| $H_2S$ | 0.118 | 0.847 |
| $NH_3$ | 0.342 | 1.806 |
| HCL | 0.056 | 0.399 |

The composition of the final product gas will also be determined from the amount of reforming of pyrolyticly-generated $C_xH_y$ compounds (to CO and $H_2$) by water vapor in the driver gas stream. These endothermic reforming reactions will be driven by the temperature of the driver gas and amount of water available. Generation of the driver gas (as described above) assures enough water to gasify the char but may not allow for enough water to adequately drive the reforming reactions higher up the reactor. The amount of reforming is controlled in either a low rate or a high rate of supplemental steam injection mode.

Commercial reformer reactions typically occur in a specifically designed tubular reactor with special catalyst at about 1200-1500° F. In this invention, some reforming reactions will be promoted by temperatures up to 2700° F. and positive thermodynamic equilibrium values. There are also catalytic effects from the trash plus the reactivity of "cracked" and broken molecules permeating the pyrolysis zone. Some of the broken molecular ends hydrogenate, others will react with the water.

Table 6 presents expected compositions of product gas under low and high reforming cases.

TABLE 6

Net Yield and Composition Ranges
PHREG for Table 1 Material
95% Oxygen Blown Driver Gas Generation

| | Low Reforming Case | High Reforming Case |
| --- | --- | --- |
| Net Yield (SCF/ton MSW) | 21160 | 37680 |
| Net Yield (% of Trash LHV) | | |
| BTU/SCF (LHV) | 812 | 461 |
| CO (mol %) | 63.4 | 41.5 |
| H2 (mol %) | 6.4 | 45 |
| CH4 (mol %) | 7.9 | 4.0 |
| CxHy (mol %) | 23.3 | 9.5 |
| Feed Steam (ton/ton MSW) | 0.0 | 0.12 |
| Driver Gas Steam (ton/ton MSW) | 0.16 | 0.32 |
| Oxygen (ton/ton MSW) | 0.25 | 0.27 |

The compositions shown assume that $CO_2$ and the other acid gases have been scrubbed out and the gas has been dehydrated, steps that are typical of commercial fuel and feed gas processing. The values in Table VI assume the use of 95% pure oxygen-blown driver gas formation.

This energy analysis shown includes the consideration of supplemental steam addition and the compression of product and recycles gases in the product gas handling systems Solids Feed Handling Concepts Solid organic feed materials (Municipal Solid Waste and other types of low economic value organic waste feeds) are dumped from rail, trucks or drums into a slope-sided receptacle. At the bottom of this receptacle is a gravity-fed belt conveyor that takes the solids to a rotating blade-type grinder or hammer mill for size reduction and density control. A magnetic tramp iron collector system is used to remove ferrous/nickel/cobalt materials from the solids stream before comminution. The discharge of the grinder feeds a second conveyor belt, which carries the solids to a lock-hopper reception bin atop the reactor. This is a very typical method of dealing with waste and organic solids for further processing and is not a claim of the invention. The description is included for completeness of concept.

Water retention with the feed is another issue that must be addressed on a site-by-site basis for the reasons described above. It is possible to add water to the feed, at several points in the feed flow, to ensure enough moisture in the solids pile to provide the proper cooling of the reactor exit gases.

Great care is taken in the reactor feed entry design to minimize the following:
1. Fugitive emissions of hydrocarbons, carbon monoxide, flammables, and particulates.
2. The inflow of free oxygen into the reactor for both product quality and safety reasons. The specified oxygen limits of less than 1000 ppm ensure that any inadvertent oxygen present in the reactor reacts quickly and safely (well below explosive limits) with driver gas components rather than solid materials.

A double-door lock hopper is used in which the top door opens with the bottom door hermetically sealed against the reactor chamber. The entire contents of the receptacle chamber drop into the lock hopper after which the top door closes to provide a similar top-seal to the environment. The bottom door of the lock hopper opens allowing its content to drop to the top of the solids pile in the reactor. An inert purge and pressurizing gas is used as a part of this purge/open/close cycle. The ideal purge gas is $CO_2$, and it is readily removable from the reactor product gases in conventional downstream gas purification equipment. An alternative but acceptable type of feed system would be a gas-purged rotary or "star" feeder. This alternative can be used if the feed has been sufficiently comminuted and dried to ensure its continuous flow capability. A number of acceptable feed mechanisms are used in blast furnaces as well.

The PHREG pyrolytic reactor has a slowly moving (downward) non-fluidized bed in a vertical shaft chemical reactor where the top-fed solids are heated as they progress downward towards the bottom of the reactor chamber. Gravity is the driving force for the materials to move downwards, while gas moving upward through the bed provides lift to help control the downward flow of materials and promote convective transport. The upward flow of the hot driver gas, countercurrent to the flow of organic reactant, provides the most efficient heat and mass transfer possible between the product gases and the feed solids.

All the adsorbed water (5-20%) on the surface of the incoming trash will be evaporated in the top of the pile. The net gas temperature out of the reactor, unless the reactor gas flow is improperly controlled, will be 200° F.-250° F., which is close to water saturation temperature at the reactor pressure. Should the exit gas temperature not be suitably cooled, a controlled water-spray flow nozzle(s) can be used in the vapor disengaging zone to accomplish this end.

Driver Gas Generation

The primary heat source for the reaction is a hot driver gas stream that is generated externally, just prior to its entry into the bottom of the reactor. The heating of this stream can be accomplished via two means. One is external conductive heat exchange to one or more of the fuels and oxidant. This is a technology well known to those versed in the arts but is limited in the maximum temperature achievable. The most effective heating scheme, however, is to combust (as nearly completely as possible) the hydrocarbon stream with near-stoichiometric or better yet, significantly sub-stoichiometric concentration levels of oxygen. This is done for five reasons:

1. Combustion heat will provide the necessary (and maximum) heat release to the gas leaving the burner.
2. Water vapor in the superheated combustion products will be adequate at least for steam gasification reactions (reactions 2 and 3 listed in earlier discussions) with the pyrolyticly-generated char.
3. Oxygen content of the gas in the reactor can be maintained preferably at zero but no greater than 1000 ppm by weight
4. CO content will be maximized, while $CO_2$ is minimized, to promote the rapid reactions in the gasification section.
5. Enough product water vapor in the superheated combustion products can be made available for partial steam reforming of the pyrolysis products.

There are two modes of driver gas generation in the PHREG process. One mode of operating the reactor will require that excess steam out of the gasification zone be minimized to promote the formation of more complex hydrocarbons in the pyrolysis zone. Another mode of operation will require enough water in the driver gas to maximize the steam reforming of the pyrolyticly generated hydrocarbons and oxo-compounds or even steam gasification reactions with the solid feed material itself. If sufficient water is not present from the driver gas formation, which will usually not be the case, supplemental steam may be added with the driver gas. In this latter case, enough additional combustion heat must be obtained to provide the enthalpy necessary to drive the shift and reforming reactions. This can be accomplished by using more oxygen up to stoichiometric equivalent, or using more feed material at existing oxygen concentration levels to the combustion unit. It is also possible to run the unit at some level between these two extremes to tailor the reactions to some specific level of hydrogen and/or carbon monoxide yield.

Various kinds of burner equipment and controls to accomplish these goals are well known to those skilled in the art. Supplemental steam may be injected into the reactor directly with the combustion gas or separately through a different port.

Reactor Operations

A detailed description of the reactor and an illustration is given in a later section but a summation will be presented here. One can refer to FIGS. 2, 3 and 4 to gain better understanding.

Figure 2:
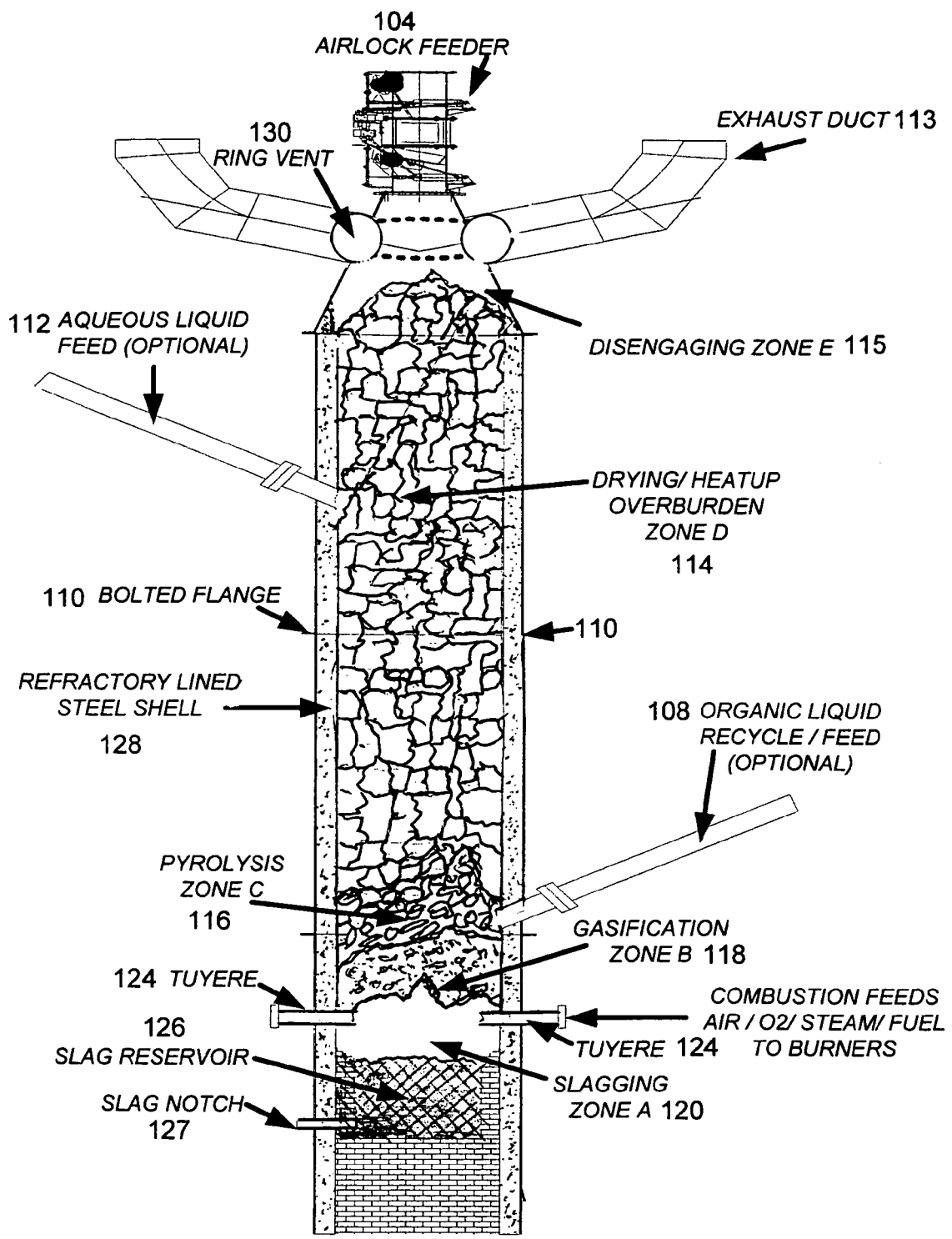
FIG. 2 is a detailed diagram of the reactor. Its operation, and the role of the associated gas and liquid processing steps, will become clearer by reference to the description below.

During normal operations, the PHREG reactor can be considered to have four distinct process zones as shown in FIG. 2. Zone A, nearest the bottom, is the melt separation zone. Here the hot driver gas at temperatures in the range of 2000° F. to 3600° F. provides the heat needed to ensure full melting of the metals and ash components of the feed trash. Immediately above Zone A is the gasification zone, Zone B where the hot recycle gas comprises an approximately equimolar mixture of carbon monoxide (CO) and hydrogen ($H_2$)— commonly called syngas—mixed with a controlled amount of water vapor. By turbulent velocity blasting of the hot reaction driver gas through the reactor tuyeres and up into the gasification bottoms, the gas reacts vigorously with the carbonaceous Zone C material.

At the temperatures and conditions existing in the reactor in Zone B the char material is completely transformed into either syngas or molten slag droplets. The droplets will coalesce and descend through the upward flowing driver gas and/or collect on the sides of the reactor hearth, slowly flowing down into the slag reservoir.

Slag formation will occur on the lower edge of the reactor's hot zone, and will take place at a temperature of incipient fusion. Being a liquid or gelatinous material at this point, the slag will separate by gravity from the less dense materials undergoing pyrolysis and gasification. Its specific gravity will be on the order of 2.0-2.5 which will allow it to adequately drop through the upward flowing driver gas.

One common method of removing such a material is to collect it in a sump of the reactor hearth, which is drained periodically by means of a tap-drill boring through a plug of fireclay. When the flow peters out, a fresh plug of fireclay is introduced by means of a mud-gun which exerts sufficient hydrostatic pressure to reverse the flow of the slag.

A potential downside of this type of slag removal is the introduction of air with its oxygen into a region of the reactor where hot reduced materials are present, with potential consequences such as combustion of solids in the pyrolysis zone. For this reason, tapping operations are performed when the internal reactor pressure above the slag reservoir is sub atmospheric and the hydraulic difference will maintain a liquid slag seal of 4-8 inches above the top of the tap hole.

In Zone C, the driver gas, including recycle, fresh feed, and newly formed syngas/gaseous char conversion products, flows upward through the reactor providing the heat for thermal destruction of the organic waste material. The products in this zone include hydrocarbon volatiles with the composition $C_xH_y$, more syngas from gasification and steam-reforming of reactive organic solids, and hydrogenation products of cracked organic chemicals such as alcohols, higher paraffins, a few organic oils and some heavier hydrocarbons that are liquid at normal temperatures. The $C_xH_y$ hydrocarbons include methane $CH_4$, ethylene $C_2H_4$, ethane $C_2H_6$, propene $C_3H_6$, propane $C_3H_8$, butenes $C_4H_8$, butane $C_4H_{10}$, pentanes $C_5H_{12}$, Benzene, Toluene and other mono- or di-substituted aromatics (Xylenes) and other related light hydrocarbons such as butadienes. The inorganic molecular components of the waste—typically Chlorine, Fluorine, Nitrogen, Sulfur, and others—will form acid compounds such as HCl, HF, $NH_3$, $H_2S$, etc in this section since the level of free oxygen is very low inside the reactor. Free oxygen leads to formation of a variety of pollutants, such as NOX, dioxins, aldehydes, ketones, etc. The acid components formed in PHREG are easily removed in downstream caustic-base scrubbers, while those formed in the presence of oxygen are difficult to remove. These latter have presented significant problems for incineration-based waste removal processes for the last thirty years.

Zone D, above the pyrolysis zone, functions to accept and dry the feed plus remove the product gas. Heat conduction from the lower bed areas and convection from the upwardly flowing gas drives off all of the surface water associated with the waste feed as well as substantial portion of that chemically bonded or adsorbed inside the waste components. This gas is removed by venting in a manner consistent with feed material free-falling to the top of the solids bead such that inadvertent loss of solids into the gas vents is minimized. The gas will also entrain the vaporized/flashed water from Zone D along with the syngas and pyrogas products generated in Zones C and B. Simple thermodynamics and temperature control dynamics will keep the exit gas temperature at approximately 200-250° F.). A water spray may be added into the top disengagement area of Zone D to help accomplish this cooling if the feed material does not contain enough water to complete the cooling.

Figure 5:
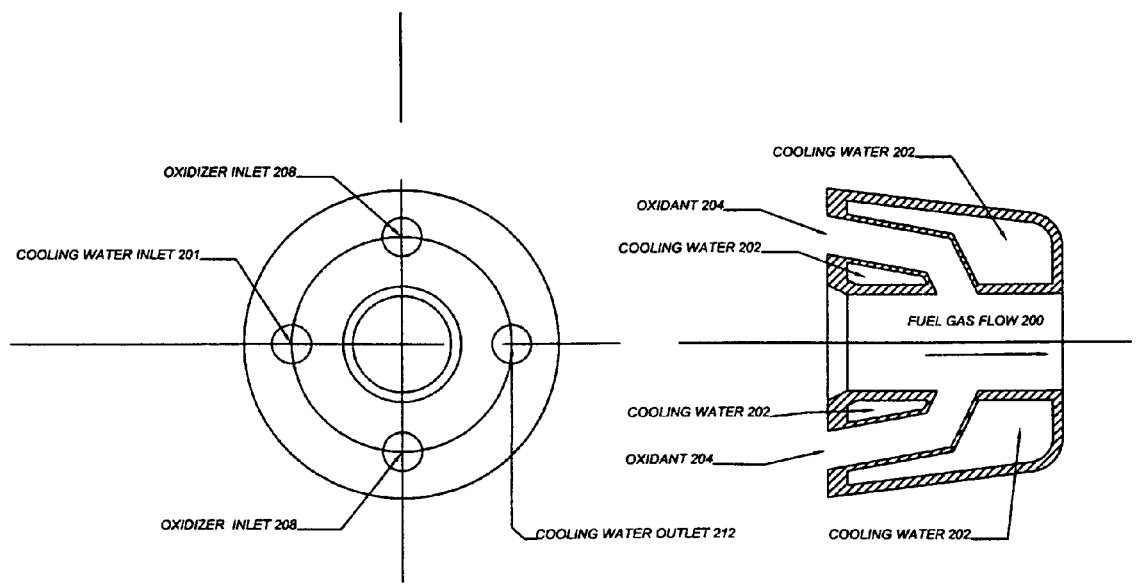
FIG. 5 shows the details of the tuyere/burner layout.

FIG. 5 shows the details of the solid rendered slagging zone of the reactor.

Process and Product Control Strategies

The operations of the reactor will be linked to the composition of the feed provided to reactor, with the feed composition monitored using fast-neutron analysis or other methodology to estimate the levels of carbon, hydrogen and oxygen. This information will be used to adjust the flow and temperature of the driver gas appropriately with a reference model control system. Exit gas from the reactor will be monitored continuously, singly or by a combination of gas chromatograph, mass spectroscopy, X-ray diffraction and spectrophotometric equipment. The information can then used to trim-calibrate the real time control model.

It is expected that most of the materials necessary to make a properly conditioned and vitrifiable slag will be contained in the reactor feed materials, but in the event that either silica-containing or clay-based components of a properly constituted slag-glass are deficient, conventional technology exists to correctively add small amounts of either type of material to the reactor feed mix. Feedstock chemistry can now be monitored by means of fast neutron activation analysis, and appropriate materials (silicaceous, argillaceous, calcareous, etc.)—can be added to adjust the potential slag chemistry in a feed-forward type of process control arrangement.

Temperatures in the PHREG reactor are controlled by:
1. the rate of introduction of fuel into the burner providing hot gases at the base of the reactor;
2. the amount of oxidant gas provided to the fuel burner that provides hot gases at the base of the reactor; and
3. by the rate of introduction of waste/feed into the top of the reactor whose C/H and H/O ratios are know.

Exit gas temperature is one key control point. Simple thermodynamics and temperature control dynamics described above will keep the exit gas temperature at approximately 200-250° F.). A water spray may be added into the top disengagement area of Zone D to help accomplish this cooling if the feed material does not contain enough water to complete the cooling.

Addition of supplemental feeds as described in the subsequent sections will also affect the temperature profile. Use of such supplements can be a temperature and product control strategy in itself.

The normal operating pressure for the PHREG reactor is about 10" of water vacuum at the top of the reactor and a vacuum of 30-50" at exit of the driver gas tuyeres. The net pressure drop through the bed will be determined by the permeability of the bed and the flow of the gas.

The reactor solid bed porosity and permeability plus the reactor bed stability are maintained by five means.
1. The irregularly sized and shaped post-consumer waste material being used as received, will maintain the permeability;
2. The sizing of any comminuted materials in the feed must be carefully monitored and the flow of such material cut back if the bed permeability begins to drop;
3. The overburdening weight of feed supply above the reaction zones will tend to keep the reaction bed in place;
4. Variance of the driver gas inlet pressure to move the solid bed incrementally (up or down) in order to break bridging; and
5. The injection of small amounts of new or recycled liquid feeds at different locations in the reactor. This will primarily affect temperature control but can be a control handle to help modify the overall reactor bed permeability.

Reactor Off-Gas Processing

The PHREG exit gas is typically routed to a wet cyclone/quencher for two purposes. During the generation of the pyrolysis off-gas (known as pyrogas) heavier organic oils, particulates, and other non-volatile compounds are formed that must be removed from the product gas stream. These materials must either be removed to storage or returned to the hotter zones of the pyrolysis/gasification sections of the PHREG reactor. The cyclone also removes carry over of feed fines, small amounts of ash from the pyrolysis zone, soot from the gasification zone, and other non-gaseous materials that could otherwise be potentially entrained in the exit gas stream. This is a very typical method of dealing with gasifier product gases for and is not a claim of the process. The description of the product gas handling is included for completeness of concept.

Typically, the cyclone-scrubber exit gas is compressed and sent to a pressurized caustic (or analogous process equivalent) absorption system for removal of acid gas components. Organic liquid condensate is also recovered and recycled to the reactor from this scrubbing system. The spent scrubber solution is flash evaporated and the water vapor purified and recycled to the process or to the gas clean up systems. A small amount of concentrated acid gas salts from the scrubber can be removed as a toxic waste, used as feed material for an inorganic chemical production facility. I can possibly be recycled to the melt collection zone of the PHREG reactor for encapsulation and fixation in the primarily alkali and alkaline earth oxide molten slag material.

The clean pyrogas/syngas mixture from the scrubber systems is used for three purposes:
1. Fuel for fired heating (external to the reactor) of the feed fuels for driver gas generation;
2. Product syngas for sale as a chemical feedstock or as a feed gas for conventional power generation systems, either steam driven or combustion-turbine driven;
3. Recycled as driver gas make, depending upon whether the process is to be operated in a base-load) self-sustaining mode or in a peak generation mode (once through with fresh fuel for driver gas generation). Optimal reactor control may dictate some modification to the amount of pyrogas that is recycled to the reaction driver gas stream.

Liquid Hydrocarbon Production

Liquids from the process (termed "white oils") are hydrocarbon compounds ranging in size from naphthas (gasoline size molecules) to tars (heavier than diesel, smaller than asphaltenes). They condense out of the reactor product gas stream as it cools, In general, they will be removed in the cyclone/quencher immediately downstream of the reactor. The liquid yield will vary greatly depending upon feed composition but is expected to be in the range of 0.5-3.5% of the net solid feed rate.

These oils can often be used to make synthetic oils, lubricants, and diesel fuel. They can be readily separated as products by those skilled in the separation process arts. In the PHREG process, these oils can either be collected as a product or they can be recycled and re-injected into the high temperature sections (pyrolysis and/or gasification) of the reactor to form more $H_2$, light hydrocarbons, and synthesis/pyrogas. As an alternative injection mode, the oils can be incinerated externally and injected into the reactor hot zones in order to augment the driver gas stream. Equipment to do this is quite conventional and readily available to those skilled in the combustion arts.

Slag Products

The feed material into the PHREG reactor will include metals, metal oxides, and various silicates and aluminates. These materials are known to form ash in a typical mass-burn operation. It is the PHREG pyrolysis process captures these materials in an inert silicate/aluminate vitrified material for use as a (EPA—landfill) de-listed byproduct or potentially commercially marketable construction fill product Feedstock chemistry can now be monitored by means of fast neutron activation analysis, and appropriate materials (silicaceous, argillaceous, calcareous, etc.)—can be added to adjust the potential slag chemistry in a feed-forward type of process control arrangement.

Some carbon may remain in the molten slag. The amount will depend upon temperature, gas-solid contact time, and steam levels as well as the convective mixing efficiency of the driver gas with the char material. Some slag materials may appear dark gray to black as a result of carbon, even at low levels. This may or may not be a problem depending upon the intended use and destination of the slag material. If this problem interferes with use of the slag, temperature and steam content of the driver gas can be increased to promote a more complete conversion of the carbon. It may be necessary to identify the feed material causing the problem and remove it from the reactor charge feed. The slag material, in any case, will still be chemically stable, non-toxic and environmentally inert.

The chemistry of the slag needs to be compatible with the refractory lining of the reactor as well as inert to the EPA standard leaching test. This is expected to require a slightly acidic slag to ensure compatibility with the abrasion resistant refractory lining.

Slag formation will occur on the lower edge of the reactor's hot zone, and will take place at a temperature of incipient fusion. The char material is completely transformed into either syngas or a molten slag droplet. Being a liquid or gelatinous material at this point, the slag will separate by gravity from the less dense materials undergoing pyrolysis and gasification. Its specific gravity will be on the order of 2.0-2.5 which will allow it to adequately drop through the upward flowing driver gas.

One common method of removing such a material is to collect it in a sump of the reactor hearth, which is drained periodically by means of a tap-drill boring through a plug of fireclay. When the flow peters out, a fresh plug of fireclay is introduced by means of a mud-gun, which exerts sufficient hydrostatic pressure to reverse the flow of the slag.

A potential downside of this type of slag removal is the introduction of air with its oxygen into a region of the reactor where hot reduced materials are present, with potential consequences such as combustion of solids in the pyrolysis zone. For this reason, tapping operations are performed when the internal reactor pressure above the slag reservoir is sub atmospheric and the hydraulic difference will maintain a liquid slag seal of 4-8 inches above the top of the tap hole.

The material, which flows from the slag notch, is typically poured out onto a "beach" of sand, and sprayed with water from "rainbird" type sprinklers to aid in quenching and then granulation, prior to collection by a front-end loader for further processing and removal. A variation of this collection method is to run the melt into refractory or sand-cast molds to make bricks, blocks, or other forms suitable for shaping the cooled vitrified material.

A second feasible means of slag extraction involves the hot melt being dropped through saturated steam to a water bath to produce instantaneous granulation and quenching. A rake mechanism such as a drag chain conveyor is then used to continuously remove the slag byproduct from the reactor. In this approach, additional safety precautions for low-pressure steam vessels are required for safe operation. An advantage of this latter method is the potential recovery of the melt energy of the slag as steam that can be pulled at normal vacuum operation into the reactor driver gas generation zone. This steam recovery can increase the energy recovery efficiency of the overall process by as much as 3 to 5%.

Thermal and Yield Efficiency Considerations

Conversion efficiency of municipal solid waste energy potential (combustion LHV content of dry material) to product pyrogas heating value is approximately 85-90% depending upon the composition of the entire feed materials. This energy analysis includes the consideration of energy content associated with supplemental steam addition, the energy of compression in the product gas handling systems, and reasonable allowances for heat losses to the surrounding environment.

The PHREG reactor must be considered in terms of its capability for self-sufficiency or sustainability. Zero sufficiency implies total usage of fresh fuel to drive the reactor. 100% sufficiency implies that at least enough product gas is manufactured to serve as the sole driver gas generation fuel to the reactor combustors. Depending upon the combustion value of the feed, self-sufficiency will require a 25%-100% recycle of the net product gas to the combustors. The minimum net combustion value of the feed must be approximately 3000 BTU/lb to achieve 100% sufficiency.

The reactor can also be run at intermediate percentage levels of sufficiency. This characteristic allows the reactor operator to respond to changing economic conditions that might call for greater or lesser net gas capacity output. A typical application for this characteristic might be the ability to use fresh feed to generate the maximum amount of output gas for a gas turbine based power generator during peak power loading times (typically mid day to early evening). Local power companies in most developed municipalities reward incremental power production at spot market rates that often reach two to three times the base-load contract rate. A PHREG reactor delivering enough gas at about 50% product gas recycle to run a 25 MW generator, could permit the peak loading generation of roughly 42-45 MW or power if no recycle is used and the product gas is used entirely for power generation.

Normal operation at 100% self-sufficiency will typically be a base load situation. The PHREG reactor only has the capability for a 10-15% turndown factor. Shutdown and startup of the reactor require several hours to several days to accomplish so effective operation of the plant means keeping it on line at nearly constant rates for significant periods of time.

Product Gas Disposition as Feedstock

The net product gas can be used in a variety of applications. The simplest use is incineration of the gas to create steam for heating or conventional steam cycle power generation. More valuable applications include the use of the product gas as fuel to gas turbine, typically generating electricity either in simple or complex cycles. Some portion of the turbine gas may be recycled to the reactor of this invention to partially provide the driver gas required by the process.

The net reactor product gas, however, consists of primarily a mixture of $C_xH_y$, CO and $H_2$, and has potential higher value uses for the manufacture of clean fuels or chemicals. Many examples of such applications are known to those skilled in the art. Synthesis gas may be converted to synthetic natural gas ($CH_4$) or synthetic diesel (typically around $C_{16}H_{34}$) using catalytic processes relying on nickel, iron, or cobalt catalysts. Synthesis gas may also be converted to methanol by catalytic processes relying on copper and chromium catalysts. Pure hydrogen may be made from synthesis gas by employing the water gas shift reaction over various catalysts and used as a fuel or as a reactant in making ammonia (using iron catalysts). Hydrogen can also be recovered from the product gas using membrane-based processes, leaving the carbon oxides to be recovered or used as fuel. Large volumes of hydrogen are used in the petroleum refining industry to convert and treat refinery streams, making cleaner and more valuable products.

Description of Some Preferred Embodiments of the Process

The PHREG process can be applied in a number of ways to reduce the volume of waste materials and produce useful and valuable products. These are shown from a study of several preferred embodiments, labeled A through J. Reference can be made to FIG. 2 for clarification of the reactor zonal mapping.

Embodiment A

The Base Case

In a preferred embodiment of PHREG that we call the Base Case, waste materials are reduced to a uniform size and fed to the top of a vertical shaft reactor system, flowing downward in contact with hot gases flowing upward. As they pass downward, the wastes are heated by the counter-current hotter gases flowing up from the bottom of the reactor. The wastes pass successively through a series of stages where they are (Zone D) dried at temperatures up to 250° F., (Zone C) pyrolyzed at temperatures of 500 to 900° F., (Zone B) gasified at 1500 to 2700° F. and (Zone A) mixed with any residual glass, inorganic ash, and metals being liquefied in the range of 2000 to 3600° F. to form a slag that is removed from the bottom of the reactor.

Driver Gas

The thermochemical driver gas, entering the bottom of the reactor in the liquefaction zone (Zone A), is formed initially by combustion of commercially available natural gas or fuel oil, or a mixture thereof, and mixed with some amount of steam, which is also generated externally to the reactor chamber. The primary requirements for the driver gas are the following:
1. sufficient temperature to carry out all reactions and provide all heat necessary to thermally drive the reactor operation;
2. sufficient water to convert all free carbon to CO or $CO_2$ via water gas shift and reforming reactions;
3. lack of free oxygen; and
4. sufficient water and hydrogen present to keep the gaseous atmosphere in a "reducing" mode in order to encourage the formation of simple hydrocarbons and acid gases.

Supplemental means of generating the driver gas are described in subsequent embodiment descriptions.

The Reactor

The reactor is essentially a blast furnace constructed of high temperature refractory material with standard blast furnace design technology. All fuel combustion takes place in one or more integral burners that are recessed into the tuyeres of the reactor. No combustion is expected inside the reaction chamber, avoiding formation of oxidized hydrocarbons such as dioxins and furans. For this reason, the free oxygen concentration of the driver gas, as it enters the reactor, must be below 2500 ppmwt and preferably below 1000 ppmwt. At these levels, any stray oxygen molecules will react quickly and completely in the gaseous phase well below explosive levels.

Products

As the stream of gas passes in an upward fashion through the descending bed of reacting solids, its mass is increased by accumulation of products of gasification, pyrolysis, and drying. This gas mixture, now cooled by loss of its sensible heat to the descending solids, leaves the top of the shaft reactor through vents and is directed to a series of separators and conditioning steps to yield products. These products include water, an oily pyrolysis liquid, and clean product gas which is a mixture of synthesis gas from reaction of water (steam) with carbon and hydrocarbons and pyro-gases (primarily $C_5+$ hydrocarbons and smaller) that form from the pyrolysis of the waste feed material in Zone B.

Some of the produced water is used internally to the manufacturing process to make steam while the rest is recovered and purified for disposal. Pyrolysis liquid is recovered, treated, and sold as clean liquid fuel. Clean product gas is converted to synthetic natural gas or to a large number of other chemicals for sale. The cleaning and conversion technology for processing this reactor product gas is well established.

Process and Product Control Strategies

The operations of the reactor are linked to the composition of the feed provided to the reactor with the feed composition monitored using fast-neutron analysis to measure levels of carbon, hydrogen, and oxygen. This information is used to adjust the flow and temperature of the driver gas appropriately with a reference model control system. Exit gas from the reactor is monitored continuously by a combination of GC or GS/MS equipment then used to trim-calibrate the real time control model.

It is expected that most of the materials necessary to make a properly conditioned and vitrifiable slag are contained in the reactor feed materials, but in the event that either silica-containing or clay-based components of a properly constituted slag-glass are deficient, conventional technology exists to correctively add small amounts of either type of material to the reactor feed mix.

Temperatures in the PHREG reactor are controlled by:
1. the rate of introduction of fuel into the burner providing hot gases at the base of the reactor;
2. the amount of oxidant gas provided to the fuel burner that provides hot gases at the base of the reactor;
3. by the rate of introduction of waste/feed into the top of the reactor whose C/H and H/O ratios are known.

Addition of supplemental feeds as described in the subsequent sections will also affect the temperature profile. Use of such supplements can be a temperature control strategy in itself.

Embodiment B

Employing Water-Based Industrial Waste Mixed into the Feed

In another preferred embodiment of PHREG, reactor feed materials are supplemented with non-form-stable, water-based or water-containing consumer and/or industrial waste or other waste organic components. This supplemental material can be sprayed or squeezed onto the base solid material at any point from the feed material hold bunkers up to the primary feed port into the reactor. The supplemental material (typically solutions, emulsions, sludges) becomes mixed into the primary feed and enters the reactor in a fashion consistent with the method of the Base Case.

The total amount of this supplemental feed is smaller than the total bulk of top-fed material. The amount is determined by the types of all feed material to the reactor, how well the supplemental feed is adsorbed by the solids, the corresponding reactor temperature profile needs, and driver gas conditions lower in the reactor.

All other operations of the reactor are as in the described method of the Base Case.

Embodiment C

Employing Solid Industrial Waste or Organic Material Mixed into Feed

In another preferred embodiment of PHREG, reactor feed materials are supplemented by solid industrial waste or other solid organic components such as wood, coal, coke, oil share, tars, and petroleum residues. This supplemental material can be added to the base solid material at any point from the feed material hold bunkers up to the primary feed port into the reactor. This supplemental material will become mixed into the primary feed and enter the reactor in a fashion consistent with the method of the Base Case.

The total amount of this supplemental feed is smaller than the total bulk of top-fed material and is determined by the types of all feed material to the reactor, the ability of the solid materials to adsorb the supplemental feed, the corresponding reactor temperature profile needs, and driver gas conditions lower in the reactor. One basic determining factor is the organic content of the material. The greater the amount of "combustible" material it contains, the more its presence helps the thermodynamic operation of the reactor. It is also possible to take a certain amount of non-combustibles and use the reactor process as a simple reduction/consolidation process with most of the supplemental material residing in the slag collected at the bottom of the reactor.

All other operations of the reactor are as in the described method of the Base Case.

Embodiment D

Providing Injection of Industrial Wastes into Stage I

In another preferred embodiment of PHREG, a supplemental feed is used consisting of non-form-stable, water-based or water-containing consumer and/or industrial waste or other waste organic components. Such solutions, emulsions or sludges are injected into the reactor in stage I, where the water evaporates and any contained solids move downward through the reactor with the main feed material. The total amount of this supplemental feed is smaller than the total bulk of top-fed material and is determined by the types of all feed material to the reactor, the corresponding reactor temperature profile needs, and driver gas conditions lower in the reactor.

All other operations of the reactor are as in the Base Case.

Embodiment E

Providing Injection for Water-Based Wastes into Stage II or Stage III

In another preferred embodiment of PHREG, a supplemental feed is used consisting of non-form-stable liquids or sludges, which contain organic solvents, industrial waste or other waste organic components. Such solutions, emulsions, or sludges are injected into the reactor in Zone B or C, where the solvent and other liquid components evaporate and immediately react to form simpler hydrocarbon compounds. Any contained solids move downward through the reactor with the main feed material. The total amount of this supplemental feed is smaller than the total bulk of top-fed material and is determined by the types of all feed material to the reactor, the corresponding reactor temperature profile needs, and driver gas conditions lower in the reactor.

All other operations of the reactor are as in the described method of the Base Case.

Embodiment F

Recycling Product Pyrolysis Liquids to the Reactor

In another preferred embodiment of PHREG, pyrolysis liquids recovered from the reactor product are injected into the reactor in Zone B or C, where the organic liquid components evaporate and immediately react to form simpler hydrocarbon compounds Any contained solids then move downward through the reactor with the main feed material. The total amount of this supplemental feed is smaller than the total bulk of top-fed material and is determined by the amount and types of pyro-oils available, the types of all feed material to the reactor, the corresponding reactor temperature profile needs, and driver gas conditions lower in the reactor.

All other operations of the reactor are as in the described method of the Base Case.

The optimal location of the injection point varies depending upon the unique reactor conditions during injection but is expected to be near the Zone B and C transition temperature area.

Embodiment G

Supplementing Driver Fuel with Other Fuels

In other preferred embodiments, the composition of the fuel provided to the external combustor is varied to allow operation at lowest cost. In the Base Case embodiment of this process, the required conditions for the driver gas to successfully run the reactor given proper feeding of the solids are:
1. sufficient temperature to carry out all reactions and provide all heat necessary to thermally drive the reactor operation;
2. sufficient water to convert all free carbon to $CO$ or $CO_2$ via water gas and reforming reactions;
3. lack of free oxygen;
4. sufficient water and hydrogen present to keep the gaseous atmosphere in a "reducing" mode in order to encourage the formation of simple hydrocarbons and acid gases.

An external source of fresh fuel such as natural gas, fuel oil, or the like is required for startup, shutdown, and emergency control for the reactor. Outside of these situations, the driver gas can be formed by combining one or more of the following fuels:

1. external natural gas
2. external fuel oil, LPG, or other suitable hydrocarbon liquid
3. recycle pyrolysis liquids from the reactor
4. recycle product gases from the reactor
5. combustible industrial waste liquids
6. combustible solids such as coal or coke given the appropriate burner equipment
7. synthesis gas, combustible flare/purge gas, hydrocarbon off gases, and/or hydrogen Once the driver gas is properly generated, all other operations of the reactor are as in the described method of the Base Case.

Embodiment H

Employing Various Oxidation Gases in Forming the Driver Gas

Another preferred embodiment of the PHREG process provides for the use of various oxidizing gases to combust the fuel in the external burners. The nature of the combustion and the amount of oxidant are such that the proper driver gas temperature and depletion of free oxygen content must be achieved. The choices of oxidant are air, air enriched with oxygen, or pure oxygen.

The choice of the level of oxygen enrichment from just above the 21% oxygen found in air and up to pure oxygen is based upon economics and is dictated by the desired role of the reactor in making useful product gas. If the only goal is to reduce organic and other waste to minimize quantities for disposal, natural gas or LPG feed with air can generate sufficient temperature for the driver gas, even with total recycle of the product gases to the burner.

Using pure oxygen as the oxidation gas provides product gas with greater value, containing only small amounts of inert gas, especially $N_2$. Again, all other aspects of the process are as described in the Base Case.

Embodiment I

Augmenting Driver Gas with Other Combustion Products

In another preferred embodiment of the PHREG process, the external combustion to form driver gas is augmented by an oxygen-depleted hot gas derived outside of the PHREG process. This allows reduction of the amount of fresh fuel and oxidant necessary to generate the PHREG driver gas. Included in this embodiment are augmenting gases from:

1. exhaust from a gas turbine that is integral to the preparation or processing of flow streams around the PHREG reactor and related processes
2. flue gas from a burner or furnace that is integral to the preparation or processing of various gas and liquid streams around the PHREG reactor and related processes.
3. effluent from a steam generation unit to provide necessary supplemental steam.

Such gases are combined with or injected separately from the combustion product gas described in the Base Case. All other operations of the reactor are as in the described method of the Base Case.

Embodiment J

Providing Removal of Product Gas from the Reactor at Several Points

In another preferred embodiment of the PHREG process, means are provided for removing streams of gas from various points in the reactor for further processing and use. As the stream of gas passes upward through the descending bed of reacting solids, its mass is increased by accumulation of products of gasification, pyrolysis, and drying. This gas mixture, now cooled by loss of its sensible heat to the descending solids, leaves the reactor through one or more points along the length of the reactor. It exits the top of the shaft reactor through vents to control temperature and composition of the gases passing through the incoming wastes in zone D. Product gases removed at various points may be combined and treated together or treated or recycled separately. Water, an oily pyrolysis liquid, and clean synthesis gas are isolated as products from the treated gas. Some of the water is used internally to make steam and the rest is recovered and purified for disposal.

Pyrolysis liquid is recovered, treated, and sold as clean liquid fuel. Clean synthesis gas is converted to synthetic natural gas for sale.

All other operations of the reactor are as in the described method of the Base Case.

By these preferred embodiments it is not our intention to limit the application of the PHREG. They illustrate preferred applications of the invention, and those skilled in the art can readily combine features of the various embodiments to provide processes to deal with other specific applications.

DETAILED DESCRIPTIONS OF DRAWINGS

A more complete understanding of the invention may be had by reference to the accompanying schematic drawings, which show an embodiment of the previously described process in some detail. All of the lines and equipment are suitably instrumented and valved to affect the appropriate process flows and conditions. The motivating force to move gas and products into through the reactor can be a combination of vacuum ejectors, pumps, blowers, compressors, and liquid pumps as appropriate, all of which can be suitably designed by those skilled in the art.

FIG. 1 shows a block schematic of a typical embodiment of the entire process, though the current invention relates only to the details of the design and operations of the reactor 2 and burners 4. We show this for completeness of concept. The other block boxes on the diagram (6, 8, 10, 12, 14) relate to process equipment systems that perform specific functions for the feeds and products of the invention but are not claimed as a part of the invention and can be suitably designed by those skilled in the art. Details of the reactor itself are shown in FIG. 2.

Referring back to FIG. 1, the process will begin with the feeding of solid organic material stream 16 into the top of the reactor 2. The reactor is a single stage, vertical updraft shaft reactor in which the solids progressively descend towards the bottom of the shaft in a countercurrent fashion against the up-flow of a hot driver gas 18. It is this hot driver gas that provides the chemical and thermal motivation for the reduction of the organic material into its final product gas 36, produced liquids 38, and slag 44.

The driver gas 18 enters the bottom of the reactor at a temperature of 2500° F.-3400° F.

The driver gas is generated by the controlled combustion in one or more (typ. 2-8) burners 4 attached to but external to the lower reactor 2 chamber. Said burners are used to affect the combustion of a fresh fuel 20, such as natural gas from offsite, or recycled product gas 22 when operating in partial or complete self-sustaining mode of operation. Auxiliary feed streams 28 that can be used in limited amounts to make driver gas include steam, flue gas, or hot turbine exhaust. The net oxidant stream 25 is comprised of a mixture of air 26 and oxygen 24 the former being generated in one of several types of oxygen plants 10 on the market today. Enriched air or even pure oxygen is desirable in the case of sustaining operation with recycle 22 of a significant amount of the reactor product gas 34.

The hot wet driver gas will react with most of the carbon from the pyrolysis char while melting the inorganic matrix material (mostly ash, glass, possibly metals) to form slag which, having a density in excess of 2.2 g/cc falls to the bottom of a slag reservoir 12. The slag can be collected and processed in a couple of ways that are detailed elsewhere in this invention description.

The reactor product gas departs from near the top of the reactor through a ring vent line 30 at a normal temperature of about 210-250° F. maximum. This gas is formed from remnants of the original driver gas, but is saturated with water from the incoming solid feed, and mixed with both syngas from the gasification section and pyrogas from the pyrolysis area.

The exit gas will typically be routed to equipment 6 such as a cyclone and/or wet quench vessel for two purposes. From the reactor off-gas 30, heavier organic oils, particulates, and other non-volatile compounds that must be removed, as stream 38, and sent to storage, stream 40 or returned 42 to the pyrolysis/gasification section of the PHREG converter. The wet cyclone-quencher also acts to catch inadvertent carry over of feed fines, small amounts of ash from the pyrolysis zone, soot, and other non-gaseous materials that would otherwise be entrained improperly in the exit gas stream 32. This is a very typical method of dealing with gasifier product gases for further processing and is not a claim of the process but the description of the product gas handling is included for completeness of concept.

Typically, the cyclone-quencher exit gas 32 is next compressed and sent to a pressurized caustic (or equivalent) acid gas absorption system 8 for removal of acid gas components. More organic liquid condensate, 72, can be recovered and recycled to the converter from this secondary scrubbing system. The spent acid gas scrubber solution, 54, diluted with condensed water vapor and contaminated with acid salts, 52, is cleaned with a number of potential unit operations such as filtration, reverse osmosis, ion exchange, flash evaporation and others well known to those skilled in the art of water treatment. The clean water recycled from units 6 and 8 is recycled as makeup to the quencher 70 and/or as make up to a steam generator for feed 62, 66 to the reactor or other utility purposes. A purge stream 46 of concentrated acid gas salts is collected, 14, ostensibly as a toxic waste. It is possible, however, that this waste stream can be used as a feed material for an inorganic chemical production facility, or possibly recycled 68 to the melt collection pit 12 of the PHREG reactor for encapsulation and fixation in the primarily alkali and alkaline earth oxide molten slag material.

Figure 3:
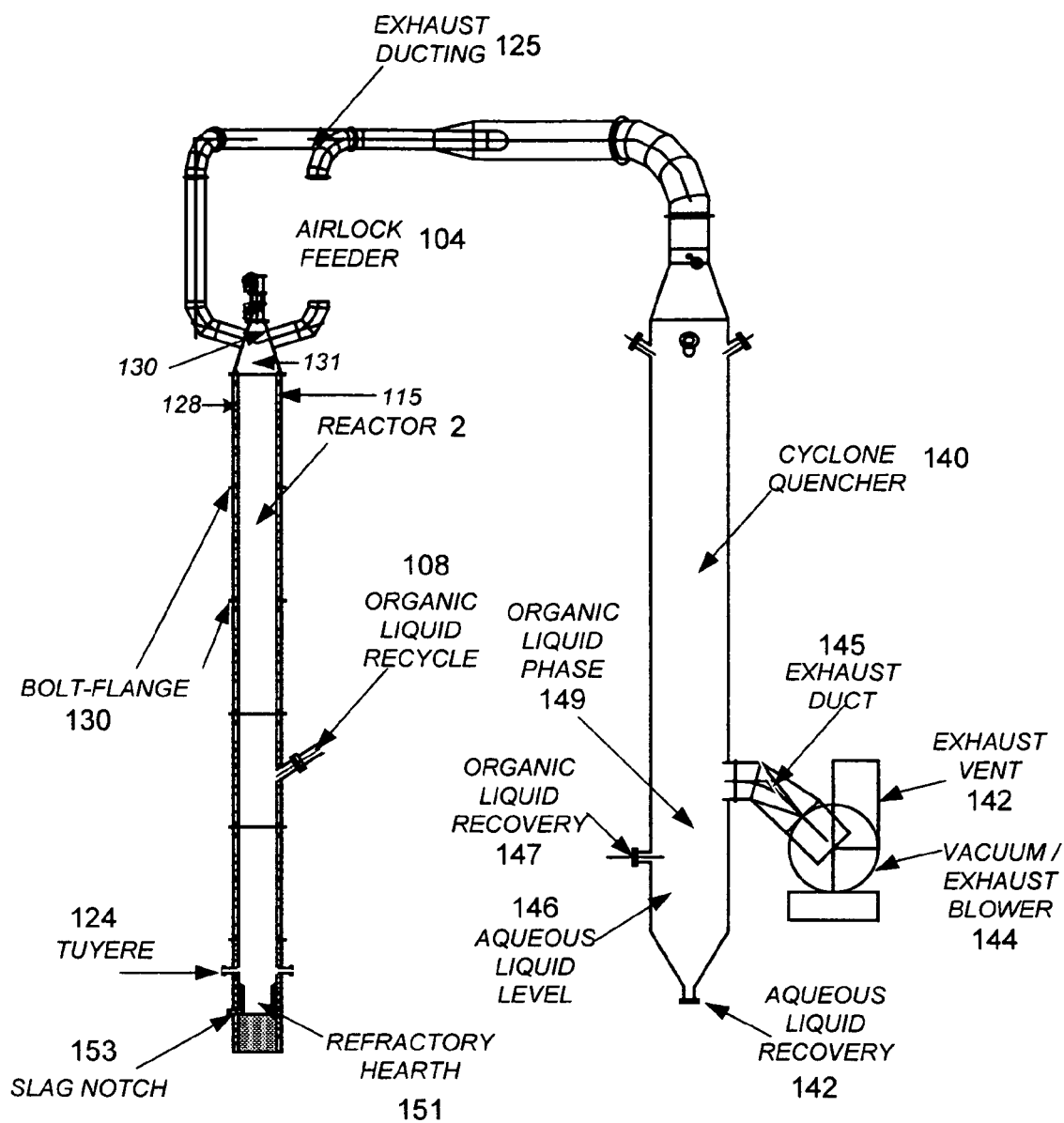
FIG. 3 shows one preferred embodiment of the reactor with attached downstream quench vessel. The layout and mechanical design of the reactor and related equipment will become clearer by reference to the description detailed below.

FIG. 3 shows a likely profile arrangement for the quench vessel, 140, in relation to the reactor. The reactor itself is a vertical shaft consisting of a refractory lined steel shell 128 that is most conveniently constructed in 2-6 foot bolted-flange segments, 110, to support customization of the reactor height to different types of expected feeds and to facilitate construction, maintenance and installation of the reactor in the plant. Optimal segment length would be twice the reach distance of a typical operations or maintenance staffer so that all points of the segment can be reached for inspection and repair.

The up-drafting reactor gases are removed via at least one, preferably multiple, vent lines emanating from the feed/vapor disengagement plenum 131 in the reactor. A ring vent, 130, circling the outside of the plenum is an efficient way to remove the gas and minimize inadvertent entrainment of any feed solids as they fall from the airlock feeder, 104, to the top of the solids pile lower in the reactor 2.

The gas vent line is constructed of standard steel ducting or refractory-lined steel pipe, 125, depending upon the possibility and probability of an excessively high temperature being experienced in the vent line during abnormal operations of the reactor. A quench water spray line into the vapor disengagement zone, 115, is necessary for three reasons:
1. to provide water to agglomerate fines and small pieces of the solid feed so they will tend to fall to the solids pile rather than follow the gas stream out the vent
2. to provide cooling capability to the exit gas for the event in which the incoming feed materials are not sufficiently moist to cool the gas stream properly
3. to provide an emergency quench spray to cool the gas below the working temperature of the vent line in the case of reactor upset.

The gas entry into the quench vessel, 140, is directed tangentially or as nearly as possible to this ideal in order to spin the gas around the periphery of the quench vessel. Such movement provides added opportunity over "straight-through" scrubbing to contact the water spray for cooling and solids removal.

The quench water is collected in a sump, 146, extending to the bottom of the quench vessel 140. A significant amount of organic materials are normally expected to normally be condensed out and will float on top of the water level in a separate phase, 149, that can be removed via standard level control methods known to those versed in the art for recycle or recovery. Depending upon the desired downstream gas processing methods to be used, the quench water can be kept at pH levels above 8 with various caustic materials. This will enhance the ability of the liquid to remove highly acidic gases such as HCL or $H_2S$. It will also remove a significant amount of $CO_2$ that must be stripped from the liquid. The exact gas processing configuration must be carefully considered for final process design.

The final feature of FIG. 3 that should be noted is the draft of the exhaust blower, 144, and motor. These are standard, commercially available components that are built to move large quantities of gas with small to moderate pressure differentials. They must also be capable of withstanding the impingement of water on the shaft and blades. The exit vent, 142, is located at least three feet above the maximum liquid level in the quench vessel, 140.

The details of the reactor operations may be better understood by reference to FIG. 2. During normal situations, the PHREG reactor can be considered to have five distinct process zones as shown in FIG. 2. Zone A, 120, nearest the bottom, is the melt separation zone. Here the hot driver gas at temperatures in the range of 2700° F. to 3400° F. provides the heat-needed to ensure full melting of the metals and ash components of the feed trash. Immediately above Zone A is the gasification zone, Zone B 118, where the hot recycle gas comprises an approximately equimolar mixture of carbon monoxide (CO) and hydrogen ($H_2$)—commonly called syngas—mixed with a controlled amount of water vapor. By turbulent velocity blasting of the hot reaction driver gas through the reactor tuyeres, 124 and up into the gasification bottoms, the gas reacts vigorously with the carbonaceous Zone C material.

At the temperatures and conditions existing in the reactor in Zone B, 118, the char material is completely transformed into either syngas or molten slag droplets. The droplets will coalesce and descend through the upward flowing driver gas and/or collect on the sides of the reactor hearth, slowly flowing down into the slag reservoir, 126.

Figure 4:
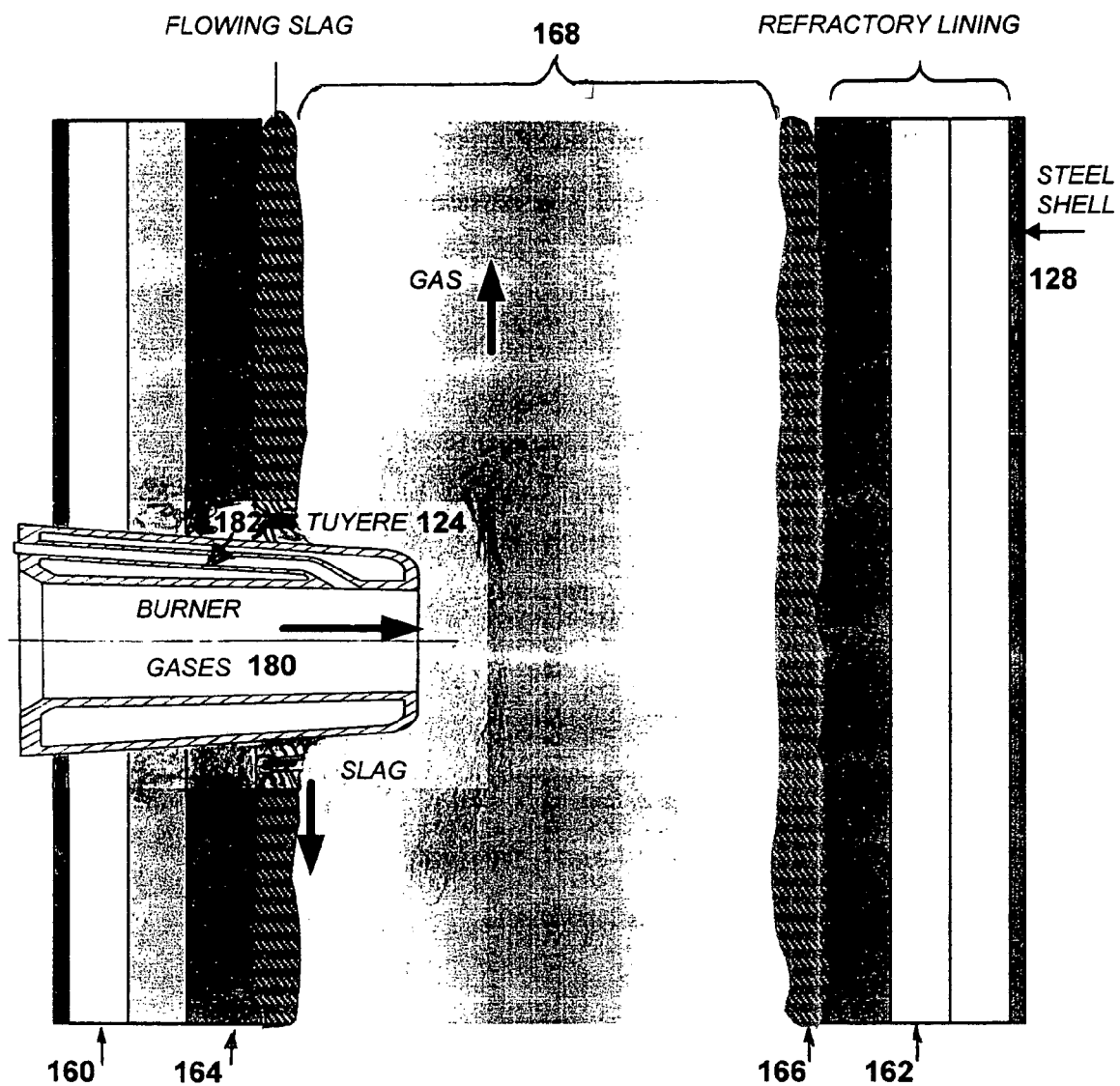
FIG. 4 shows details of the reactor hearth zone.

FIG. 4 shows this zone in more detail. The shell of the reactor, 128, is lined with multiple types of refractory material, typically three layers, 160, 162, 164, to minimize corrosion in and heat loss from the reactor. The innermost layer of material, 164, is a high temperature acid-based refractory that is readily and commercially available.

Slag formation will occur on the lower edge of the reactor's hot zone, and will take place at a temperature of incipient fusion. Being a liquid or gelatinous material at this point, the slag will separate by gravity from the less dense materials undergoing pyrolysis and gasification. Its specific gravity will be on the order of 2.0-2.5 which will allow it to adequately drop through the upward flowing driver gas or collect and flow down the reactor walls, 166.

The gas is burned in the tuyere 124 such that the burner product is exhausted immediately into the reactor plenum, 168. The temperature of the produced driver gas is such that the burner components will likely require some mode of external cooling. Typically, a high volume cooling water stream, 202, is used to keep the tuyeres from melting.

Returning to FIG. 2, one can examine the methodology of slag removal. One common method of removing such a material is to collect it in a sump, 126, of the reactor hearth, which is drained periodically by means of a tap-drill boring, 127, through a plug of fireclay. When the flow peters out, a fresh plug of fireclay is introduced by means of a mud-gun, which exerts sufficient hydrostatic pressure to reverse the flow of the slag.

A potential downside of this type of slag removal is the introduction of air with its oxygen into a region of the reactor where hot reduced materials are present, with potential consequences such as combustion of solids in the pyrolysis zone 110. For this reason, tapping operations are performed when the internal reactor pressure above the slag reservoir is sub atmospheric and the hydraulic difference will maintain a liquid slag seal of 4-8 inches above the top of the tap hole.

The material, which flows from the slag notch, is typically poured out onto a "beach" of sand, and sprayed with water from "rainbird" type sprinklers to aid in quenching and then granulation, prior to collection by a front-end loader for further processing and removal. A variation of this collection method is to run the melt into refractory or sand-cast molds to make bricks, blocks, or other forms suitable for shaping the cooled vitrified material.

A second feasible means of slag extraction involves the hot melt being dropped through saturated steam to a water bath to produce instantaneous granulation and quenching. A rake mechanism such as a drag chain conveyor is then used to continuously remove the slag byproduct from the reactor. In this approach, additional safety precautions for low-pressure steam vessels are required for safe operation. An advantage of this latter method is the potential recovery of the melt energy of the slag as steam that can be pulled at normal vacuum operation into the reactor driver gas generation zone. This steam recovery can increase the energy recovery efficiency of the overall process by as much as 3 to 5%.

Both types of slag removal have been successfully used in gasifier operations.

By again examining FIG. 2, the remaining function of the PHREG reactor is detailed.

In Zone C, 110, the driver gas, including recycle, fresh, and newly formed syngas and gaseous char conversion products, flows upward through the reactor providing the heat for thermal destruction of the organic waste material. The products in this zone include hydrocarbon volatiles with the composition $C_xH_y$, more syngas from gasification and steam-reforming of reactive organic solids, and hydrogenation products of cracked organic chemicals such as alcohols, higher paraffins, a few organic oils and some heavier hydrocarbons that are liquid at normal temperatures. The $C_xH_y$ hydrocarbons include methane $CH_4$, ethylene $C_2H_4$, ethane $C_2H_6$, propene $C_3H_6$, propane $C_3H_8$, butenes $C_4H_8$, butane $C_4H_{10}$, pentanes $C_5H_{12}$, Benzene, Toluene and other mono- or di-substituted aromatics (Xylenes) and other related light hydrocarbons such as butadienes. The inorganic molecular components of the waste—typically Chlorine, Fluorine, Nitrogen, Sulfur, and others—will form acid compounds such as HCl, HF, $NH_3$, $H_2S$, etc in this section since the level of free oxygen is very low inside the reactor. Free oxygen leads to formation of a variety of pollutants, such as NOX, dioxins, aldehydes, ketones, etc. The acid components formed in PHREG are easily removed in downstream caustic-base scrubbers, while those formed in the presence of oxygen are difficult to remove. These latter have presented significant problems for incineration-based waste removal processes for the last thirty years.

Zone D, 114, above the pyrolysis zone, functions to accept and dry the feed plus remove the product gas. Heat conduction from the lower bed areas and convection from the upwardly flowing gas drives off all of the surface water associated with the waste feed as well as substantial portion of that chemically bonded or adsorbed inside the waste components.

This gas is removed in Zone E, 112, by venting in a manner consistent with feed material free-falling to the top of the solids bed in such a manner that inadvertent loss of solids into the gas vents is minimized. The gas will also entrain the vaporized/flashed water from Zone D along with the syngas and pyrogas products generated in Zones C and B. Simple thermodynamics and temperature control dynamics will keep the exit gas temperature at approximately 208-212° F. The maximum temperature in all cases must be limited to 250° F. A water spray may be added into the top disengagement area of Zone E to help accomplish this cooling if the feed material does not contain enough water to complete the cooling.

FIG. 5 (not to scale) shows the internal details of the burner and tuyere where the driver gas fuel, 200, is combusted with the oxidant, 204, prior to injection into the reactor. The internal cooling water channels, 202, are supplied by the inlet connection, 201, and drained through outlet 212, which allows this geometry to survive in such a hostile environment.

Comparison and Discussion of Prior Art and the Method and Device of this Invention As illustrated previously, many attempts have been made to describe new processes that convert various organic materials to useful or less dangerous products. The chemistry and viability of the reactions are well established. Many of these processes show great ingenuity. However, none of them provides the needed high volume reduction without resorting to incineration or combustion of reactor solids with its attendant problems of creating dangerous pollutants such as dioxins and furans. This is because the incineration processes operate with excess air to avoid leaving a carbonaceous byproduct while most of the pure pyrolysis processes generally operate at temperatures too low to convert the byproduct wastes in high yields. Gasification processes are generally more complex, often operating at high pressures, making them very expensive to build and operate. As can be seen from previous descriptions and preferred embodiments below, the PHREG process avoids these problems by operating in the absence of excess oxygen and at very high temperatures in a near atmospheric pressure reactor of relatively simple design and operational control.

Similarities with the Prior Art

With regard to vertical shaft reactor patents mentioned above along with the current invention of this patent, all produce a clean-burning gas product, eliminate pollution admissions to the atmosphere, and are flexible enough to handle a variety of solid wastes. Each uses the concept of countercurrent up-flow of gas vs. down-flow of solids in a single vertical shaft reactor. All can use oxygen enrichment to minimize the thermodynamic inefficiencies of inert diluents and to allow temperatures great enough to melt the slag, thus avoiding costly and problematic handling of intermediate ash or char products. All use the solids overburden as a filter for minimizing fines generation and provide a direct-contact convective heat transfer of energy from gas to solids. Finally, the chemistry and yield of the product gases from each facilitate economic production of power or chemicals from standard tested commercial processes that can directly use the product gas from the reactor. The chemistry of the vertical shaft reactor is well established.

Dissimilarities with and Limitations of the Prior Art

All of the prior art for organic waste gasification and pyrolysis processes have one or more of the following characteristics and corresponding problems:
1. High-pressure operation. Though designed to produce higher quality products and integrate with hydraulic expander technology, these require expensive materials of construction and present potential safety hazards;
2. Internal (to the reactor) mechanical devices such as feeders, rams, and augers, which are subject to corrosion and mechanical operating problems;
3. Low temperature pyrolysis processes that have char handling between multiple reactors and chambers. These processes are expensive and prone to mechanical operating problems;
4. Solid char removal, which is potentially dangerous, has environmental problems, has mechanical handling problems, and has economic disposal liabilities;
5. Incineration of the feed material. This typically has environmental problems that require expensive pollution control equipment and has lower heat recovery efficiency;
6. Use of free-oxygen based combustion to generate heat. Problems are as listed below;
7. Batch operation. Low initial cost but very limited throughput capacity and labor intensive. Only suitable for high cost disposal material such as medical waste;
8. Catalyst usage. Expensive and prone to poisoning from heteroatoms in the waste feed;
9. Internal and/or external heating by electric or plasma arcs. Inefficient from an energy efficiency standpoint and limited in throughput capacity.

With regard to vertical shaft reactors specifically, the prior art for the patents mentioned above, and for nearly all other vertical shaft reactors now in use, rely upon some form of direct combustion of char or even the feed material, as the primary source of reaction heat. This solid combustion scheme has five main problems:
1. It is often unpredictable in terms of bed temperature control and oxidant throughput capability. The oxygen flow needs are not always predictable.
2. The rate of reaction and throughput are limited by the rate of the solid combustion, an often uncontrollable and unreliable reaction.
3. Changes in the permeability of the solids bed directly affect both the rate of driver gas flow and the rate and magnitude of the thermal energy release.
4. Some complex hydrocarbon compounds are oxidized into pollutant precursors of such compounds as dioxins and furans.
5. Entrance of free oxygen of sufficient concentration to provide a strong, consistent solids oxidation front can constitute a safety hazard in that approximately 3.5 v % (35000 ppmv) O2 in high temperature flammables is considered near the lower explosive limit. Several reactor explosions in the early days of gasification technology attest to this possibility.

Two additional problems initially noted in subsequent Union Carbide patents (with municipal or consumer waste material in vertical shaft reactors) are:
1. The tendency towards occasional bridging across the reactor shaft, thereby inhibiting the continual downward progress of the solid material.
2. The tendency of the material, especially finely shredded waste, to compact in the overburden stack to the point of inhibiting flow of gas through the solid bed.

ADVANTAGES OF THE CURRENT INVENTION

The PHREG process of the present invention is therefore designed to minimize all of these problems in order to use the type of reactor that is best suited to the greatest throughput conversion of feed material.

The PHREG equipment design concept is a single shaft reactor, similar to a blast furnace, using a countercurrent upward flow of hot driver gas against a down-flow of solid feed material. Similar types of reactors have been proposed and successfully utilized for waste gasification. This type of reactor has some very basic economic advantages for this purpose. These are:
1. It has relatively simple, and therefore inexpensive, construction design using conventional materials (high temperature refractory material) that can handle the temperatures and pressures involved.
2. It can be designed, built, and assembled in modular segments.
3. It is capable of processing far higher rates of a heterogeneous organic solids (such as MSW) throughput than other types of continuous MSW gasifiers especially EMR/plasma enhanced or kiln reactors.
4. Reactor scale-up is primarily and consistently a function of diameter squared with the height being relatively constant for a given mass velocity of feed.

5. The reactor can be operated at pressure ranges from several inches of water vacuum under normal conditions to positive pressures up to 50 psi for short periods of time.
6. It provides maximum convective heat and mass transfer efficiency from gas to solids.
7. It minimizes the escape of soot and char products formed in the gasification and pyrolysis zones by utilizing the feed overburden as a filter.
8. It provides relatively simple control that has far fewer time lags and a shorter time constant than the char/feed-burn gasifiers.
9. It handle a higher amount of wet feeds than other types of gasifiers because of the very effective drying zone.
10. It Minimizes or even eliminates emissions and pollutants common to other direct combustion based (of solids) gasification or incineration-based waste processing processes.

In all the cases that we know of, the existing worldwide collection of vertical shaft reactors for MSW and similar feeds inject significant amounts of free oxygen into the reactor and rely upon direct combustion of the solid material to supply all or part of the heat necessary to drive the entire process. The problems with this combustion have been mentioned previously.

The uniqueness of the PHREG updraft shaft reactor process concept is to limit any direct combustion to the driver gas feed source, using less than complete combustion of the fuel components, so that no significant amount of free oxygen enters the reactor chamber. This avoids the previously discussed problems of primary dioxin/furan and other complex organic pollutant generation and provides the following additional benefits:

1. Precise and reliable control of temperature and total convective (the most effective form) heat flow into the reactor solids bed by adjustment of fuel and oxidant amounts.
2. Generation of adequate water at a temperature sufficient to cleanly and completely gasify the char formed during the pyrolysis reactions while retaining enough heat in the resultant upward gas stream to pyrolize (thermally crack molecules of) the down flowing solid organic feed material.
3. More control of the composition of the reactor product gas, allowing some chemical "tailoring" to fit its ultimate usage. Typically would be the promotion of steam reforming/shift of various CO and CxHy components by addition of supplemental steam to the gasification zone.
4. The ability to tightly control driver gas flow rate in order to "lift" or ebulliate the solids bed in order to break potential bridges and increase the porosity and permeability of the bed.
5. Avoid the potential of explosive mixtures of oxidant and fuel.
6. Maximize the oxidation rate for heat and oxygen control by putting it completely into the gas phase.
7. Provide either a mode of recycling organic liquid or removing a liquid oil/tar phase product as the economics of recovery dictate.
8. Provide a high enough gas flow to reduce pyrolysis section residence time below that required for secondary (reaction with solid matrix material) formation of dioxins and furans.

The PHREG design concept is to minimize the complexity and cost of the reactor by using conventional construction materials and relatively simple operation. The design for the present invention concept has six basic intents:

1. Minimization of the complexity and cost of the reactor by use of conventional construction materials suitable to the high temperature process conditions.
2. Use of a relatively simple scheme from a control and process operator's standpoint.
3. Provide for flexibility of organic solid feed materials whereby nearly any type of organic waste or refuse materials can be blended to various extents and used for the feed. Wet waste material is suitable up to a significant amount and is often valuable to the reaction, especially for a reactor site where a utility water source is limited.
4. Provide for flexibility of driver gas feed source. The driver gas can be generated using a combination of air/oxygen, fresh fuel, recycled reactor gas, combustion flue gases (stack gas or gas turbine exhaust), and steam. The only requirements for the final driver gas are that it have an adequate flow, be sufficiently hot, devoid of free oxygen, and contain enough water to sufficiently drive the carbon conversion thermo-chemical processes.
5. The reaction process can be self-sustaining, possibly with a net production of combustible gas, or it can simply be used to reduce the weight (10 fold) and volume (20 fold) of waste material for ultimate disposal. In order to be self-sustaining, the feed material must have a minimum organics content roughly equivalent to a reaction of combustion of about 3000 Btu/lb of MSW.
6. Finally, net product gas can be readily cleaned of acid gases and particulates with inexpensive conventional technology and the gas (an enriched synthesis gas) used for several economically viable purposes from the generation of electricity or steam to production of several commercially valuable chemicals.

Up to this time most pyrolytic reactors have been fabricated with corrosion-resistant stainless steels and other high temperature metallic (limited to about 1800 F max) materials of construction. The use of metal as the primary containment for the reaction limits the upper temperature that can be utilized, is expensive, especially for reactors that run at higher pressures, and is still susceptible to corrosion especially at temperatures near its operating maximum. The reactor design of this invention uses conventional blast furnace construction technology with refractory brick in a thin (approximately ¼") carbon steel shell to withstand the high internal temperatures and be able to hold internal pressures of up to 50 psig for short periods of time if necessary. Normal operation of the reactor is under a slight vacuum in order to maximize the safety of operations for plant operators.

The flexibility and function of driver gas feed source is another unique feature. PHREG driver gas can be generated using a combination of air/oxygen, fresh fuel, recycled reactor gas, combustion flue gases (stack gas or gas turbine exhaust), and steam. The only requirement for the final driver gas is that it have an adequate flow, be sufficiently hot, devoid of free oxygen, and contain enough water to drive the process chemistry, especially the steam gasification of the pyrolyticly-generated char. This simple concept we believe to be uniquely ours.

Finally, flexibility of feed source is designed into the PHREG design. Nearly any type of waste materials can be blended and used for the feed. Wet waste material is suitable in significant quantities, a claim that most other competing technologies cannot make. A broad distribution of feed material sizes is also useful and desirable in maximizing the permeability of the solids overburden stack.

We claim:

1. A process for the production of gaseous effluent product rich in hydrogen, carbon monoxide, and other fuel gases from a feed of heterogeneous organic material comprised of municipal trash, refuse, garbage, other post-consumer wastes or combinations thereof, which process comprises:

(a) subjecting a feed of heterogeneous organic material in a single reaction chamber under conditions essentially devoid of free oxygen sufficient to gasify said heterogeneous organic material; wherein said gasification and pyrolysis occur via an upward countercurrent flow of a wet, oxygen-devoid thermal driver gas having sufficient heat and water content to effect anaerobic gasification and pyrolysis contacting directly a downward flowing moving bed of said heterogeneous organic material; wherein said driver gas is produced externally to said single reaction chamber; and (b) producing said gaseous effluent product and separating said product by conventional methods for subsequent use as a chemical feed stock or as a subsequent fuel; and (c) removing slag, in the form of liquid exiting the single reactor chamber and solidifying said slag under ambient conditions for optional subsequent use, with the proviso that in the reaction conditions of step (a), the hot driver gas is essentially devoid of free oxygen wherein the free oxygen content ranges from about 0 to less than 1000 ppm.

2. The process of claim 1, wherein depending upon the heterogeneous organic material present as the feed:

the driver gas has a temperature of about 2000-3600 F at the reactor inlet in step (a);

pyrolysis is performed at a temperature between 500-1200 F in step (a);

gasification is performed at a temperature between 1200-2500 F in step (a); and the produced gaseous effluent exiting from the reaction chamber in step (b) has a temperature of 200-250 F.

3. The process of claim 1 wherein the driver gas has a water content of 1.1-3.5 times the molar amount of carbon formed from the pyrolysis of the heterogeneous organic material.

4. The process of claim 1 is wherein the solid feed material itself comprises up to 30% by individual volume or 75% by total accumulated volume of solid organic material selected from the group consisting of tires, wood, plastics, paper, petroleum residue, coke, charcoal, wood, forest by-products, agricultural waste, medical waste, asphalt, metals, asbestos, batteries and combinations thereof.

5. The process of claim 1 wherein the sum of heterogeneous organic material is replaced by up to about 25% of the total heterogeneous organic material by total weight selected from the group consisting of heavy oils, lube oils, waste hydrocarbons, black liquor, organic solvents, chlorinated solvents, paint, and carcinogenic organics.

6. The process of claim 1 for the production of said gaseous effluent product from a feed of heterogeneous organic material wherein the hot driver gas from an external heat source performs the following functions:

(aa) gasifies the carbon in the pyrolytic residual slag of step (c) to less than 0.1 wt % of the final solid effluent via the reaction $C+H_2O \rightarrow CO+H_2$, making a syngas product that adds to the total driver gas stream;

(bb) liquefies the pyrolytic slag material to allow for its ultimate removal from the reaction chamber; and (cc) drying dries and removing removes water entrained by surface adsorption or other physico-chemical attraction to the feed material charged into the reaction chamber.

7. The process of claim 6 wherein the driver gas is comprised of oxygen-depleted products from any combustion process that is both (i) external to the reactor and (ii) comprised of a solid, liquid, or gaseous fuel.

8. The process of claim 1 wherein the driver gas has a chemical potential comprising a reducing atmosphere in which incidental heteroatoms, X, selected from the group consisting of chlorine, fluorine, bromine, sulfur, nitrogen and combinations thereof found in the solid feed material, are liberated by pyrolysis to form the expected acid or base gases.

9. The process of claim 1 wherein the driver gas has a fuel source comprised of natural gas; diesel oil; residual oil; wood, biomass, coal, petroleum coke, charcoal; recycled syngas; recycled white oils; or other carbonaceous material.

10. The process of claim 1 wherein the driver gas of step (a) comprises steam, exhaust from combustion turbines, exhaust from fired heaters, or the effluents from the gaseous effluent product of step (b).

11. The process of claim 1, step (b) wherein:

the produced fuel gases comprise a composition of CxHy, wherein x is selected from 1 to 8 and y is selected from 4 to 12.

12. The process of claim 1 for the production of said gaseous effluent from a feed of heterogeneous organic material wherein the reaction chamber for the process further comprises:

(a') identifying the types of known organic heat content such as plastic, paper, and sludge, of solid feed of said heterogeneous organic material in step (a); and (b') analyzing in step (a) exact real time feed calorific and component determination of C/H, C/O, and O/H ratios via fast neutron analysis or equivalent scanning methodology; and (c') performing statistical analysis and correlation of feed types for step (a) with easily measured bulk properties such as density; and (d') using data obtained in steps (a'), (b') and (c'), controlling the two flows of step (a) wherein said anaerobic gasification and pyrolysis occur via an upward countercurrent flow of a wet, oxygen-devoid thermal driver gas contacting directly a downward flowing moving bed of solid feed material; and (e') analyzing exact real time determination of reactor off-gas calorimetric content for step (b) via on-line spectrophotometric or GC-analysis and component analysis via GCMS analysis or appropriately calibrated spectrophotometric analyses.

13. The process of claim 12 wherein control of the reaction chamber temperature and reaction profile is accomplished by:

calculation and adjustment and manipulation of oxidant flow, fuel flow, supplemental gas flow, total feed, and organic feed material content.

14. The process of claim 12 wherein the solid bed porosity and permeability in the reaction chamber are maintained by:

(A) using the irregularly sized and shaped post-consumer waste material as received, (B) varying the driver gas inlet pressure to move the solid bed incrementally in order to break bridging.

15. The process of claim 12 wherein slag product flow at the bottom of the reactor is enhanced by further adding silica, alumino-silicates, alkaline earth oxides, clays, sandy sludge, or specialty papers to the feed material.

16. The process of claim 12 wherein the molten slag in the reaction chamber is removed by collection in a reservoir at the bottom of the reaction chamber and is removed using a hot tap with mud gun control as in a standard blast furnace or by dropping into a reservoir of water in which the melted material is cooled and results in a course granulated product.

17. The process of claim 12 wherein the reaction chamber is constructed of a steel or other metal shell that is lined with a sufficient amount of standard refractory material to resist the high temperature, acids, and abrasives.

18. The process of claim 12 wherein the reaction chamber is constructed in several flanged and bolted segments of 2 to 6 feet in height in a form such that fabrication, transport, installation and maintenance of each segment is easily and readily accomplished with standard construction and maintenance equipment.

19. A process for the production of gaseous effluent product rich in hydrogen, carbon monoxide, and other fuel gases as obtained from a feed of heterogeneous organic material comprised of municipal trash, refuse, garbage, or other post-consumer wastes, heavy oils, lube oils, waste hydrocarbons, black liquor, organic solvents, chlorinated solvents, paint, carcinogenic organics, tires, wood, plastics, paper, petroleum residue, coke, charcoal, forest by-products, agricultural waste, medical waste, asphalt, metals, asbestos, batteries, or combinations thereof, which process comprises:

(A') subjecting a feed of a heterogeneous organic material in a single reaction chamber under conditions essentially devoid of free oxygen sufficient to gasify said heterogeneous organic material wherein said gasification and pyrolysis occur via an upward countercurrent flow of a wet oxygen-devoid thermal driver gas having sufficient heat and water content to effect anaerobic gasification and pyrolysis contacting directly a downward flowing moving bed of heterogeneous organic material and wherein said driver gas is produced externally to said single reaction chamber, thus:

(B') producing effluent fuel gases of having a composition comprising methane, ethane, ethylene, propene, propane, butanes, C4H8, butadienes, pentanes, C5H10, benzene, toluene, xylenes, or combinations thereof; and:

(C') generating slag, which is in the form of liquid exiting the single reactor chamber and solidifying said slag under ambient conditions for optional subsequent use.

* * * * *